US009611337B2

(12) United States Patent
Hase et al.

(10) Patent No.: US 9,611,337 B2
(45) Date of Patent: Apr. 4, 2017

(54) CHAIN TRANSFER AGENT, PHOTOSENSITIVE COMPOSITION, CURED PRODUCT OF PHOTOSENSITIVE COMPOSITION, AND METHOD FOR CURING PHOTOSENSITIVE COMPOSITION

(75) Inventors: Tatsuya Hase, Yokkaichi (JP); Makoto Mizoguchi, Fukuoka (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP); KYUSHU UNIVERSITY, Fukuoka (JP)

( * ) Notice: Subject to any disclaimer, the term of this patent is extended or adjusted under 35 U.S.C. 154(b) by 151 days.

(21) Appl. No.: 13/995,306

(22) PCT Filed: Jan. 25, 2012

(86) PCT No.: PCT/JP2012/051525
§ 371 (c)(1),
(2), (4) Date: Jun. 18, 2013

(87) PCT Pub. No.: WO2012/102299
PCT Pub. Date: Aug. 2, 2012

(65) Prior Publication Data
US 2013/0338327 A1 Dec. 19, 2013

(30) Foreign Application Priority Data

| Jan. 27, 2011 | (JP) | 2011-014885 |
| Jun. 1, 2011 | (JP) | 2011-123281 |
| Sep. 13, 2011 | (JP) | 2011-199570 |
| Sep. 13, 2011 | (JP) | 2011-199571 |

(51) Int. Cl.
| *C08F 2/38* | (2006.01) |
| *C08F 2/50* | (2006.01) |
| *C08G 18/67* | (2006.01) |
| *C08L 75/16* | (2006.01) |
| *C08G 18/80* | (2006.01) |
| *C08G 18/81* | (2006.01) |

(52) U.S. Cl.
CPC .................. *C08F 2/38* (2013.01); *C08F 2/50* (2013.01); *C08G 18/672* (2013.01); *C08G 18/8038* (2013.01); *C08G 18/8175* (2013.01); *C08L 75/16* (2013.01)

(58) Field of Classification Search
CPC combination set(s) only.
See application file for complete search history.

(56) References Cited

U.S. PATENT DOCUMENTS

| 6,191,181 B1 | 2/2001 | Weikard et al. |
| 2002/0019485 A1 | 2/2002 | Nakajima et al. |

| 2006/0199875 A1 | 9/2006 | Kitano et al. |
| 2008/0306221 A1 | 12/2008 | Kania |
| 2010/0036045 A1 | 2/2010 | Huybrechts et al. |
| 2012/0055693 A1 | 3/2012 | Yamaguchi et al. |

FOREIGN PATENT DOCUMENTS

| CA | 2 465 715 A1 | 5/2003 |
| JP | A-07-003171 | 1/1995 |
| JP | A-07-118369 | 5/1995 |
| JP | A-07-224133 | 8/1995 |
| JP | A-08-027043 | 1/1996 |
| JP | 08-176247 A | 7/1996 |
| JP | H09-286171 A | 11/1997 |
| JP | A-11-050014 | 2/1999 |
| JP | A-11-296106 | 10/1999 |
| JP | A-2000-154230 | 6/2000 |
| JP | A-2000-191734 | 7/2000 |
| JP | A-2000-515200 | 11/2000 |
| JP | A-2000-355605 | 12/2000 |
| JP | A-2001-002760 | 1/2001 |
| JP | A-2001-523290 | 11/2001 |
| JP | A-2002-012811 | 1/2002 |
| JP | A-2003-321506 | 11/2003 |
| JP | A-2004-519534 | 7/2004 |
| JP | A-2005-068241 | 3/2005 |
| JP | A-2005-508412 | 3/2005 |
| JP | A-2006-176587 | 7/2006 |
| JP | A-2006-274240 | 10/2006 |
| JP | A-2009-210636 | 9/2009 |
| JP | H07-26167 A | 1/2010 |
| JP | A-2010-083933 | 4/2010 |
| JP | A-2010-094927 | 4/2010 |
| JP | A-2010-120982 | 6/2010 |
| JP | A-2010-519384 | 6/2010 |
| JP | A-2010-150517 | 7/2010 |
| JP | A-2010-188686 | 9/2010 |

(Continued)

OTHER PUBLICATIONS

Lalevee et al., "Thiyl Radical Generation in Thiol or Disulfide Containing Photosensitive Systems," *Macromolecular Chemistry and Physics*, vol. 210, pp. 311-319, 2009.

(Continued)

*Primary Examiner* — Sanza McClendon
(74) *Attorney, Agent, or Firm* — Oliff PLC

(57) ABSTRACT

There are provided a photosensitive composition, and a cured product of the photosensitive composition, the photosensitive composition being an ultraviolet curable composition that is curable in a short time while a portion of the photosensitive composition such as a dark portion where radicals are not generated at all is curable. A cured product is obtained by curing a photosensitive composition by ultraviolet irradiation, the photosensitive composition containing an ultraviolet curable material, and a chain transfer agent that contains an ingredient (a) that is a compound containing at least one kind selected from the group consisting of a urethane bond, a urea bond and an isocyanate group, and an ingredient (b) that is a metal-containing compound, wherein a portion of the composition where irradiation light does not reach is curable.

18 Claims, 3 Drawing Sheets

(56) References Cited

FOREIGN PATENT DOCUMENTS

| JP | A-2011-021070 | 2/2011 |
| JP | A-2011-032405 | 2/2011 |
| JP | A-2011-241278 | 12/2011 |
| WO | WO 93/22355 A1 | 11/1993 |
| WO | WO 98/04603 A1 | 2/1998 |
| WO | WO 98/50436 A1 | 11/1998 |
| WO | WO 00/34345 A1 | 6/2000 |
| WO | WO 2005/071792 A1 | 8/2005 |
| WO | WO 2009/111725 A1 | 9/2009 |
| WO | WO 2010131471 A1 * | 11/2010 |

OTHER PUBLICATIONS

Ogawa, Tetsuo, "Study of Emulsion Polymerization Based on Addition-fragmentation Chain Transfer Reaction," *Kansai Paint Co., Ltd.*, No. 137, pp. 11-17, Oct. 2001 (With Abstract).

Tarumoto et al., "Molecular Design of the High Efficient Co-initiators with Bisimidazole," *Journal of Printing Science and Technology*, vol. 43, No. 2, pp. 26-32, 2006 (With Abstract).

Kabatc et al., "*N*-Methylpicolinium Derivatives as the Coinitiators in Photoinitiating Systems for Vinyl Monomers Polymerization," *Journal of Polymer Science: Part A: Polymer Chemistry*, vol. 47, pp. 576-588, 2009.

Japanese Office Action issued in Application No. 2011-123281; Dated Sep. 18, 2012 (With Translation).

Japanese Office Action issued in Application No. 2011-199570; Dated Sep. 18, 2012 (With Translation).

Japanese Office Action issued in Application No. 2011-199571; Dated Sep. 18, 2012 (With Translation).

International Search Report issued in Application No. PCT/JP2012/051525; Dated May 1, 2012 (With Translation).

Japanese Office Action issued in Japanese Patent Application No. 2013-076723 on Jul. 1, 2014 (with translation).

Japanese Office Action issued in Application No. 2011-123281; Dated Jun. 18, 2013 (With Translation).

Nov. 11, 2014 Office Action issued in Japanese Application No. 2011-014885.

Japanese Office Action issued in Japanese Patent Application No. 2013-076723 on Apr. 15, 2014 (with translation).

Office Action issued in Chinese Patent Application No. 201280006931.1 dated Jul. 10, 2014 (with translation).

Jun. 16, 2015 Office Action issued in Japanese Patent Application No. JP2011-014885.

Mar. 17, 2015 Notification of Reason(s) for Refusal issued in Japanese Application No. 2013-163799.

Jan. 21, 2015 Office Action issued in Korean Application No. 10-2013-7020176.

Aug. 12, 2015 Extended European Search Report issued in European Application No. 12739177.9.

Jul. 21, 2015 Office Action issued in Korean Application No. 10-2013-7020176.

Sep. 18, 2015 Office Action issued in Korean Application No. 10-2013-7020176.

Office Action issued in Japanese Patent Application No. 2013-163799 dated Aug. 19, 2014 (with translation).

\* cited by examiner

CHAIN TRANSFER AGENT, PHOTOSENSITIVE COMPOSITION, CURED PRODUCT OF PHOTOSENSITIVE COMPOSITION, AND METHOD FOR CURING PHOTOSENSITIVE COMPOSITION

TECHNICAL FIELD

The present invention relates to a chain transfer agent, a photosensitive composition, a cured product of the photosensitive composition, and a method for curing a photosensitive composition.

BACKGROUND ART

A bonding process, a coating process, and a shielding process are important in a material processing and a material molding, and a variety of materials are used in the processes. Materials that are capable of being added or coated at room temperature and have a property of being cured by some subsequent action have been used through the ages especially from the viewpoint of workability.

In general, many of adhesive agents or coating materials are used in a method in which a pigment or a resin is dissolved in an organic solvent or water, an intended mixture is coated with the pigment or the resin in the form of liquid, the organic solvent or the water is volatilized, and thus a cured product is obtained. However, there are problems in that when the organic solvent is used, a health hazard or a possibility of catching fire may be caused by gas that is volatilized, and in that when the water is used, it takes time to obtain the cured product due to low volatilization of the water. In order to solve these problems, the following methods (1) to (4) are mainly used as a method in which substances in the form of liquid are cured after addition and coating without using a solvent.

(1) A method in which two low-volatile liquid compounds that react to each other are cured by being blended and immediately added and coated to accelerate the reaction.

(2) A method in which a low-volatile liquid compound is cured by reaction to water in the air after addition and coating of the compound.

(3) A method in which a low-volatile liquid compound is cured by initiating a curing reaction by heating the compound after addition and coating of the compound.

(4) A method in which a low-volatile liquid compound is cured by causing a reaction by irradiating the compound with light or an electron ray after addition and coating of the compound.

In the method (1), a reaction of an epoxy group is used in the curing reaction, and a curing agent such as polyamine and polyol is blended into an epoxy compound such as glycidyl bisphenol A. An epoxy compound is widely used in the curing reaction because the cured epoxy resin has high mechanical strength, and is excellent in many characteristics such as electric characteristics, heat resistance, water resistance, and chemical resistance.

However, the two-liquid blended material of the method (1) is remarkably low in preservation stability after the blending, so that the blended material needs to be used immediately. Thus, the two compounds need to be blended at every use.

In the method (2), a reaction of an alkoxy silyl group such as a room-temperature moisture-curing modified silicone resin, a reaction of an α-cyanoacrylate group such as a cyanoacrylate adhesive, and a reaction of an isocyanate group such as an isocyanate group-containing urethane polymer are used in the curing reaction, and blending or heating is not required in the reaction. However, the curable compositions have the following shortcomings.

The room-temperature moisture-curing modified silicone resin and the isocyanate group-containing urethane polymer have a shortcoming that curing the compounds takes a few tens of minutes to a few tens of hours, and further, if the compounds are coated a little thicker, the inside is not solidified while only the surface is solidified. In addition, the cyanoacrylate adhesive has a shortcoming that while the curing reaction is initiated with absorbed water on an adherend surface, the reaction to water in the air is slow, and curing the entire adhesive takes a few minutes to a few hours when the adhesive is used in molding or coating where the adhesive is not sandwiched between a pair of adherends, and further, curing the adhesive takes more time when internal curing is performed.

In order to correct the shortcomings regarding the curing speed or the internal curing described above, attempts to add a basic compound or an organic metal as a catalyst to the compounds have been made. However, there is a conflicting problem in that when the reactivity of the compounds to water is increased, the preservation stability of the compounds is lowered on the other hand.

Also in the method (3), a reaction of an epoxy group is used in the curing reaction, and a curing reaction is caused as in the method (1) while making the curing agent inactivate at room temperature by increasing the melting point of the curing agent, introducing a protective group having a thermal dissociation property into the curing agent, or microencapsulating the curing agent. The curing agent is blended, and heated, whereby the curing agent is activated to cause a curing reaction. This method requires no blending, and is capable of uniformly curing only the portion of the compound to which heat is applied in a relatively short time.

However, the curing reaction of the method (3) requires heating in order to cure the compound, so that when a thick cured product is to be obtained, or the compound is cured while an adherend is cured together, a long heating time or a special heating method is required in order to make the heat spread the entire compound to be raised up to a curing initiation temperature. In addition, there is a problem in that the compound needs to be refrigerated because the curing proceeds slowly at room temperature.

In the method (4), a radical polymerization reaction of a compound in which molecules have double bonds such as an acrylate derivative is used in the curing reaction. That is, a compound that generates radicals by being irradiated with light or an electron ray is blended into an acrylate derivative in advance, and a curing reaction is caused by irradiating the compound with light or an electron ray in the method (4). Using the compound that is a radical species having high activity, this method requires no blending or heating, and is capable of curing the compound in a short time.

However, in the method (4), while having high activity, the radical species have a short lifetime and easily have their activity lost by oxygen, so that as soon as the irradiation is stopped, the curing reaction stops. Thus, there is a problem in that the portion of the compound that ultraviolet irradiation light does not reach (dark portion) cannot be cured.

In order to solve these problems, methods described in Patent document 1 to Patent document 5 are proposed. However, these methods have the following problems.

Described in Patent document 1 is a method that ultraviolet curing and moisture curing are used in combination, where the compound is moisture cured to a dark portion after ultraviolet curing. However, the moisture curing takes time, and curing the entire compound takes a same time as curing the moisture-curing resin.

Described in Patent document 2 is a method that an epoxy resin is cured by a photo cation polymerization initiator that generates a cation by being irradiated with ultraviolet light. The cations (Lewis acid) generated in this method have a long lifetime unlike the radicals; however, there is a problem in that the cations pollute an adherend such as a metallic material because the cations are acid. In addition, a cation generating agent is generally a special kind of ionic pair and high in cost.

Described in Patent document 3 is a method that curing is initiated by insulating oxygen. A dark portion of a bonded surface where oxygen is intercepted can be cured effectively; however, a thick compound or an open type compound cannot be cured. That is, this method cannot be used for coating or sealing.

Described in Patent document 4 is a method that curing is initiated with near infrared light. The near infrared light, which is transmitted at a high rate through a substance, is capable of curing a portion of a compound that ultraviolet light or visible light cannot reach; however, it is difficult for the near infrared light to obtain high energy, so that curing the compound takes a few minutes. In addition, an irradiation device that is higher in cost than a UV light irradiation device is required in most cases.

Described in Patent document 5 is a method that an ultraviolet radical generating agent and a thermal radical generating agent are used in combination. A dark portion of a compound can be cured by radicals that are generated from the thermal radical generating agent; however, the thermal radical generating agent needs to be stored by using a special kind of deactivation method because a peroxide derivative is used as the thermal radical generating agent, so that a reaction does not occur if preservation stability of the thermal radical generating agent is improved. In addition, the peroxide derivative has a property of oxidation decomposing an organic substance even at room temperature, so that preservation stability of the thermal radical generating agent is remarkably lowered even with a slight rise in temperature. In addition, when the peroxide derivative remains after the curing, the peroxide derivative causes deterioration of the cured product.

In addition, the radical polymerization has a shortcoming such that if the generated radicals are partially uneven in amount, the polymerized material is accordingly uneven in molecular mass, so that a highly-reliable material cannot be obtained.

In order to solve these problems, a mechanism to capture and transport generated radicals to a site where radicals are small in amount or a site where radicals are not generated is studied as a method for curing a portion of a compound where the radicals are small in amount such as a dark portion without using a thermal radical generating agent such as a peroxide derivative. A chain transfer agent is considered as the mechanism.

A chain transfer agent has a special kind of structure, and is capable of capturing or transporting radicals. A chemical structure of a compound in which molecules have atoms of sulfur such as a thiol compound, and a chemical structure of a compound having an α-methylstyrene dimer, a methacrylic ester n-mer, and aromatic atoms of nitrogen of imidazole compound are studied as the chemical structure of the chain transfer agent. Those compounds are descried in the following Patent document 6 to Patent document 9, and Non-patent document 1 to Non-patent document 4.

In addition, as ultraviolet curable materials expand in application, the ultraviolet curable materials have large problems relating to improvement in physical property and functionalization of cured products in addition to a curing property. In order to solve these problems, materials prepared by instilling or blending a variety of materials in the ultraviolet curable materials have been reported (see Patent document 10 to Patent document 14).

Patent document 10 describes instilling a powdered organic compound and a fibrous organic compound in an ultraviolet curable material in order to improve the thermal expansibility and the smoothing property of the ultraviolet curable material.

Patent document 11 describes instilling a conductive metallic oxide, a metallic powder, conductive carbon black, alkali metal salt of lithium compound, or quaternary ammonium salt in an ultraviolet curable material in order to prevent static charge of the ultraviolet curable material.

Patent document 12 describes blending a polymer in an ultraviolet curable material in order to improve the light resistance of the ultraviolet curable material.

Patent document 13 describes instilling a light-shielding filler or a filler for light attenuation in an ultraviolet curable material in order to improve the accuracy of the form of the ultraviolet curable material.

Patent document 14 describes instilling carbon, carbon fibers or carbon cloth in an ultraviolet curable material in order to improve the strength of the ultraviolet curable material.

As described above, the methods for instilling the variety of fillers in the ultraviolet curable materials are described in Patent documents 10, 11, 13 and 14, and the method for blending the polymer in the ultraviolet curable material is described in Patent document 12. Especially if the latter polymer can be blended in the ultraviolet curable material without any limitation, the form of the curing materials before the curing is not limited to the liquid form, and curing materials in the forms of a wax, a sheet, and a tape can be produced because the physical properties of the curing materials can be easily changed. Thus, the curing materials in the forms of a wax, a sheet, and a tape can find a wide variety of applications as new materials.

However, when infilling or blending the solid materials and the polymer in the ultraviolet curable materials, most of the solid materials and the polymer shield, absorb, or scatter the projected ultraviolet light, and prevent the projected ultraviolet light from being transmitted through themselves (i.e., most of the solid materials and the polymer define ultraviolet transmission inhibitors). For this reason, the ultraviolet light does not reach deep portions of the ultraviolet curable materials sufficiently, and the deep portions are not cured sufficiently.

This insufficient curing results from the properties of curing reaction type radicals that are generated by the ultraviolet light irradiation. The properties are based on the curing reaction principle of the ultraviolet curable materials, that is, the radicals have properties such that the generated radicals have a remarkably short lifetime to easily have their activity lost by oxygen, so that polymerization reaction does not occur outside of the region where the radicals are generated.

In order to solve these problems, a variety of methods in order to infill or blend the substances in the ultraviolet curable materials are devised in the above-described literatures. Examples thereof include method (A) to method (E) as follows.

Method (A): reported in Patent document 10 is a method for reducing the average particle diameter of the powdered organic compound to the ultraviolet wavelength or less, a method for not preventing the ultraviolet transmission by using glass fiber capable of transmitting light as the fibrous organic compound.

Method (B): reported in Patent document 11 is a method for not preventing the ultraviolet transmission by enhancing the efficiency of the infilling by improving the physical properties of the resin to reduce the used amount of the infilling to 5% or less.

Method (C): reported in Patent document 12 is a method for not preventing the ultraviolet transmission by making two layers of the blended polymer and the ultraviolet curable material and limiting the optical absorption wavelength of the blended polymer to a wavelength that does not prevent the ultraviolet curing.

Method (D): reported in Patent document 13 and Patent document 14 is a method for curing an epoxy resin of a matrix by generating cations that have a relatively long lifetime by the ultraviolet light irradiation and dispersing the cations to the back side of a shielding attenuating filler.

Method (E): also reported in addition to the above-described methods is a method for curing a portion of the material where the ultraviolet light does not reach while there is no description of a curing property of a material that contains a ultraviolet transmission inhibitor (see Patent document 1 and Patent document 15). Above-descried Patent document 1 describes a method for moisture curing a portion of the material where the ultraviolet light does not reach in combination with curing a silicone resin. Above-descried Patent document 15 describes a method for anionically-polymerizing by water a portion of the material where the ultraviolet light does not reach while using 2-cyanoacrylate.

RELATED ART DOCUMENTS

Patent Documents

Patent document 1: Japanese Unexamined Patent Application Publication No. 07-224133
Patent document 2: Japanese Unexamined Patent Application Publication No. 07-118369
Patent document 3: Japanese Unexamined Patent Application Publication No. 11-50014
Patent document 4: Japanese Unexamined Patent Application Publication No. 2006-274240
Patent document 5: Japanese Unexamined Patent Application Publication No. 2010-150517
Patent document 6: Japanese Unexamined Patent Application Publication No. 2003-321506
Patent document 7: Japanese Translation of PCT International Application Publication No. JP-T-2005-508412
Patent document 8: Japanese Unexamined Patent Application Publication No. 2000-355605
Patent document 9: Japanese Unexamined Patent Application Publication No. 2006-176587
Patent document 10: Japanese Unexamined Patent Application Publication No. 2005-68241
Patent document 11: Japanese Unexamined Patent Application Publication No. 2010-94927
Patent document 12: Japanese Unexamined Patent Application Publication No. 2010-188686
Patent document 13: Japanese Unexamined Patent Application Publication No. 11-296106
Patent document 14: Japanese Unexamined Patent Application Publication No. 2001-2760
Patent document 15: WO 2005/71792

Non-Patent Documents

Non-patent document 1: *Macromolecular Chemistry and Physics,* 2009, Volume 210, pp. 311 to 319
Non-patent document 2: Tetsuo Ogawa, *TORYO NO KENKYU*, Kansai Paint Co, Ltd., October 2001, no. 137, pp. 11 to 17
Non-patent document 3: Naohiro Tarumoto and Shigeru Takahara, *Journal of printing science and technology,* 2006, volume 43, no. 2, pp. 26 to 32
Non-patent document 4: *Journal of Polymer Science: Part A: Polymer Chemistry,* 2009, volume 47, pp. 576 to 588

SUMMARY OF INVENTION

Problems to be Solved by the Invention

It turned out that there are problems as follows when using the chain transfer agents described in Patent document 6 to Patent document 9, and Non-patent document 1 to Non-patent document 4 in order to improve the curing property of the dark portion in the radical polymerization.

There is a problem of specific odor when using the methods described in Patent document 6 and Non-patent document 1 in which a compound having a mercapto group and a compound having a disulfide group are used as the chain transfer agents.

There is a problem in that the chain transfer agents are low in chain transfer efficiency and need to be added in large quantity, and reduced in weather resistance by the remaining chain transfer agents when using the methods described in Patent document 7 and Non-patent document 2 that define methods in which α-methylstyrene dimers are used as the chain transfer agents.

There is a problem in that the chain transfer agents are not capable of chain transferring radicals to a site where radicals are not generated when using the methods described in Patent document 8 and Patent document 9 that define methods in which methacrylic ester n-mers are used as the chain transfer agents because the methods are used for controlling the molecular masses of the polymers.

The methods described in Non-patent document 3 and Non-patent document 4 define methods in which aromatic nitrogen compounds such as an imidazole and N-methyl-4-picolinium are used as the chain transfer agents. These compounds are high in degree of basicity to easily undergo oxidation, which exerts an adverse influence on the preservation stability of the polymers.

In addition, while effects exerted on a polymerization reaction and uniformalization of distribution of the molecular masses of the polymers are described in all of Patent document 6 to Patent document 9, and Non-patent document 1 to Non-patent document 4, a property of transferring generated radicals by a certain distance to initiate or progress a polymerization reaction at a site where radicals are not generated is not described.

Conventional chain transfer agents are used at the prospect of capturing radicals relating to polymerization to uniformalize the degree of radical polymerization nearby, that is, it can be said that conventional chain transfer agents have a roll as molecular weight modifiers for the polymers. However, there has been conventionally no such a chain transfer agent that is capable of initiating or progressing a polymerization reaction at a site where radicals are not generated at all in a radical polymerization reaction.

In view of the problems described above in the conventional arts, the present invention has an object to provide a chain transfer agent that is higher in chain transfer efficiency than any other conventional transfer agent, and is capable of initiating or progressing a polymerization reaction at a site where radicals are not generated at all beyond a site in the vicinity of molecules of the chain transfer agent.

Further, the present invention has an object to provide a photosensitive composition, and a cured product of the photosensitive composition, the photosensitive composition being an ultraviolet curable composition that is curable in a short time while a portion of the photosensitive composition such as a dark portion where radicals are not generated at all is curable.

In addition, method (A) to method (E) described above, which are methods for improving the curing properties of the compositions that are prepared by adding the materials for absorbing the irradiation light such as ultraviolet light to the photosensitive materials, have the following problems.

In method (A), there are problems in that making the material ultrafine causes an increase in cost, and in that the use material is limited to a material that transmits ultraviolet light if the material could lose its physical properties when made fine.

In method (B), there is a problem in that the amount of the infilling is limited, so that it is difficult for the composition to achieve sufficient efficiency except in cases where a special kind of material is used.

In method (C), there is a problem in that when blended with the ultraviolet curable resin, most kinds of polymers are clouded, and ultraviolet transmission of the ultraviolet curable resin is inhibited because of a difference in refractive index or dispersibility, so that the polymer cannot be blended with the ultraviolet curable resin, and a processing method is limited, and also the absorption wavelength of the polymer and an irradiation device are limited. Thus, the method cannot be used widely.

In method (D), there is a problem in that a cation generating agent that is used in the method is generally high in cost, and is required in large quantity because the cation generating agent cures the cations at slow rate. In addition, there is a problem in that because the cations are acid, they could pollute an object in contact with the cations, or an infilling if the object or the infilling is a metal or a metal compound.

In method (E), there is a problem in that unreacted unsaturated double bonds remain at a site where ultraviolet light does not reach, or at a site where ultraviolet light does not reach sufficiently, which could cause color change of a cured product by oxidation, or shrinkage of the cured product. In addition, there is a problem in that the moisture curing takes time in Patent document 1, and there is a problem in that the material is difficult to preserve because the 2-cyanoacrylate easily reacts with water in the air in Patent document 15.

Examples of the above-described ultraviolet transmission inhibitor include the following materials. Ultraviolet transmission of the following ultraviolet transmission inhibitors are inhibited by the influences noted in brackets.

i) An organic/inorganic filler; talc, silica, a clay mineral, calcium carbonate, and melamine (optical path shielding, light scattering)

ii) A carbon/metallic particle; activated carbon, a carbon nanofiller, and a copper powder (optical path shielding)

iii) Short/long fiber; potassium titanate, carbon fiber, and glass fiber (optical path shielding, light scattering)

iv) A polymer/oligomer; polyvinyl chloride, an acrylate resin, an elastomer, and rubber (light scattering, optical path refraction, ultraviolet absorption)

v) Another modifying additive; hydrotalcite, phosphate, borate, and brominated aromatic series (optical path shielding, light scattering, ultraviolet absorption)

Under the present conditions, the photosensitive compositions to which the above-described materials are added are used while the forms of the ultraviolet transmission inhibitors are taken into consideration, the ultraviolet light irradiation method are improved, or a special kind of method made by combining curing methods of a variety of kinds is used. For this reason, use applications of the photosensitive compositions are limited, so that it is difficult for the photosensitive compositions to be used widely in a variety of materials.

In addition, the present invention has another object to provide a photosensitive composition that is curable to its dark portion even when an ultraviolet transmission inhibitor such as an organic/inorganic filler, a carbon/metallic particle, short/long fiber, polymer/oligomer, and another modifying additive exists in the material composition, and another object to provide a method for curing a photosensitive composition that is curable to its dark portion whether or not an ultraviolet transmission inhibitor exists in the material composition.

Means of Solving the Problems

To achieve the objects and in accordance with the purpose of the present invention, a chain transfer agent according to the present invention contains an ingredient (a) that is a compound containing one or more pieces of at least one kind selected from the group consisting of a urethane bond, a urea bond and an isocyanate group, and an ingredient (b) that is a metal-containing compound.

It is preferable that in the chain transfer agent according to the present invention, the ingredient (b) is a metal-containing compound containing at least one kind of metal selected from the group consisting of tin, copper, zinc, cobalt, and nickel.

It is preferable that in the chain transfer agent according to the present invention, a ratio between the ingredient (a) and the ingredient (b) is within a range from 100:0.001 to 100:10 at a mass ratio.

It is preferable that the chain transfer agent according to the present invention is used by being added to a radical polymerizable material, and is arranged to improve a curing property of the radical polymerizable material at a site where no radical is generated.

In another aspect of the present invention, a photosensitive composition according to the present invention contains an ultraviolet curable material, and a chain transfer agent containing an ingredient (a) that is a compound containing at least one kind selected from the group consisting of a urethane bond, a urea bond and an isocyanate group, and an ingredient (b) that is a metal-containing compound, wherein a portion of the composition where irradiation light does not reach is curable.

It is preferable that in the photosensitive composition according to the present invention, a ratio between the ultraviolet curable material and the chain transfer agent is within a range from 90:10 to 10:90 at a mass ratio.

It is preferable that in the photosensitive composition according to the present invention, the ingredient (b) of the chain transfer agent is a metal-containing compound containing at least one kind of metal selected from the group consisting of tin, copper, zinc, cobalt, and nickel.

It is preferable that in the photosensitive composition according to the present invention, a ratio between the ingredient (a) and the ingredient (b) is within a range from 100:0.001 to 100:10 at a mass ratio.

In another aspect of the present invention, a cured product according to the present invention is made from the photosensitive composition according to the present invention that is cured.

Yet, in another aspect of the present invention, another photosensitive composition according to the present invention contains an ultraviolet curable material, a chain transfer agent, and an ultraviolet transmission inhibitor arranged to inhibit ultraviolet transmission, wherein the chain transfer agent contains an ingredient (a) that is a compound containing one or more pieces of at least one kind selected from the group consisting of a urethane bond, a urea bond and an isocyanate group, and an ingredient (b) that is a metal-containing compound.

It is preferable that in the another photosensitive composition according to the present invention, the ingredient (b) of the chain transfer agent is a metal compound containing at least one kind of metal selected from the group consisting of tin, copper, zinc, cobalt, and nickel.

It is preferable that in the another photosensitive composition according to the present invention, a ratio between the ingredient (a) and the ingredient (b) is within a range from 100:0.001 to 100:10 at a mass ratio.

Yet, in another aspect of the present invention, another cured product according to the present invention is made from the another photosensitive composition according to the present invention that is cured by an ultraviolet curing reaction.

Yet, in another aspect of the present invention, a method according to the present invention for curing a photosensitive composition that contains an ultraviolet curable material and a chain transfer agent includes making the chain transfer agent transfer a curable activated species that is generated when the photosensitive composition is irradiated with ultraviolet light to a site in the photosensitive composition where the irradiation light does not reach, and chain curing the photosensitive composition whether or not an ultraviolet transmission inhibitor that inhibits ultraviolet transmission exists in the photosensitive composition.

Yet, in another aspect of the present invention, another photosensitive composition according to the present invention contains a polyisocyanate compound having two or more isocyanate groups, (meth)acrylate of a polyol having one or less hydroxyl group, the number of which is set by ester bonding two or more hydroxyl groups of and the polyol having two or more hydroxyl groups with the (meth)acrylate, and an ultraviolet polymerization initiator.

It is preferable that the another photosensitive composition according to the present invention further contains one or more than two kinds of metal complex compounds containing a metal selected from the group consisting of tin, copper, zinc, cobalt, and nickel.

It is preferable that in the another photosensitive composition according to the present invention, a ratio between the isocyanate compound and the (meth)acrylate of the polyol is within a range from 90:10 to 10:90 at a mass ratio.

Yet, in another aspect of the present invention, another cured product according to the present invention is made from the another photosensitive composition according to the present invention that is cured.

Effects of the Invention

The contained ingredient (a) that defines the compound containing the one or more pieces of at least one kind selected from the group consisting of the urethane bond, the urea bond and the isocyanate group, and the contained ingredient (b) that defines the metal-containing compound form a metal complex, where the metal of the metal-containing compound is bonded via nitrogen atoms and oxygen atoms contained in the urethane bond, the urea bond and the isocyanate group. The metal complex is used as the chain transfer agent according to the present invention.

The chain transfer agent according to the present invention is capable of fulfilling the function of transferring generated radicals between molecules or within molecules while the generated radicals are stabilized. Thus, adding the chain transfer agent according to the present invention to a radical polymerizable material can add polymerization reactivity to the radical polymerizable material, the polymerization reactivity being different from polymerization reactivity that is added when a conventional chain transfer agent is added.

In other words, when a polymerization reaction is carried out in the state where the chain transfer agent according to the present invention exists in a system containing the radical polymerizable material, the chain transfer agent according to the present invention instantaneously transfers the radicals generated in the system to a site in the radical polymerizable material where radicals are not generated. As a result, a polymerization reaction is initiated at the site in the radical polymerizable material where radicals are not generated, and thus a radical polymerization reaction can be progressed.

For example, when an ultraviolet curable material is used as the radical polymerizable material, radicals were not conventionally generated at a dark portion of the material that ultraviolet irradiation light does not reach, and the dark portion cannot be cured easily. Meanwhile, by adding the chain transfer agent according to the present invention to the ultraviolet curable material, the radicals are chain transferred to the dark portion by the chain transfer agent, which allows the dark portion to be cured.

Using the chain transfer agent according to the present invention can eliminate the necessities of a working process for blending a curing agent immediately before curing, and a process for curing a dark portion by heating or moisture-curing after light irradiation. Thus, using the chain transfer agent according to the present invention allows a curing operation of the radical polymerizable material to be performed in a short time, and allows the radical polymerizable material to have excellent curing workability.

When the chain transfer agent according to the present invention is added to the radical polymerizable material and is used, the portion of the material that irradiation light does not reach can be cured in a convincing way. Thus, even when the radical polymerizable material is formed into the shape including a portion shadowed in ultraviolet light irradiation, which is the case where the radical polymerizable material cannot be used conventionally, the shadowed portion can be cured in a convincing way. Thus, the shape of a cured product is not limited, and the material can conform to a wide variety of shapes of cured products.

Even when the radical polymerizable material is contained in a composition containing a material that inhibits transmission of ultraviolet light, adding the chain transfer agent according to the present invention to the composition allows the composition to be cured to the inside surely.

Because the photosensitive composition according to the present invention contains the ultraviolet curable material, and the chain transfer agent that contains the ingredient (a) that defines the compound containing at least one selected from the group consisting of the urethane bond, the urea bond and the isocyanate group, and the ingredient (b) that defines the metal-containing compound, and has the configuration that the portion of the composition where irradiation light does not reach is curable, the chain transfer agent is capable of fulfilling the function of transferring an activated species that is generated by an ultraviolet curing reaction between molecules or within molecules while the activated species is stabilized when the ultraviolet curable material is cured. Irradiating the ultraviolet curable material with ultraviolet light to photo polymerize the photosensitive composition while the chain transfer agent is blended in the ultraviolet curable material allows the chain transfer agent to instantaneously transfer the generated polymerization reaction activated species to the portion of the composition that the irradiation light does not reach (dark portion) to cure the portion (dark portion curing). Thus, the dark portion that the ultraviolet light does not reach, which cannot be easily cured conventionally because the ultraviolet light does not reach, can be cured.

Using the photosensitive composition according to the present invention can eliminate the necessities of a working process for blending a curing agent immediately before curing, and a process for curing a dark portion by heating or moisture-curing after light irradiation. Thus, the photosensitive composition according to the present invention allows a curing operation to be performed in a short time, and has excellent curing workability.

Because the cured product according to the present invention is made from the photosensitive composition described above that is cured, a portion of the cured product that the irradiation light does not reach, which cannot be easily cured conventionally because the irradiation light does not reach, can be cured in a convincing way and display favorable physical properties. In addition, because the portion that the irradiation light does not reach can be cured in a convincing way, even when the cured product has the shape including a portion shadowed in irradiation, which is the shape where the cured product cannot have conventionally, the shadowed portion can be cured. Thus, cured products having a wide variety of shapes can be obtained.

Because the another photosensitive composition according to the present invention contains the ultraviolet curable material, the chain transfer agent, and the ultraviolet transmission inhibitor arranged to inhibit ultraviolet transmission, and the chain transfer agent contains the ingredient (a) that defines the compound containing at least one selected from the group consisting of the urethane bond, the urea bond and the isocyanate group, and the ingredient (b) that defines the metal-containing compound, even when transmission of the projected ultraviolet light is inhibited by being shielded, absorbed or scattered, a cured radical species instantaneously reach the back side or a deep portion of a shielding from a site in the photosensitive composition that is irradiated with the ultraviolet light by the chain transfer effect of the chain transfer agent, whereby a curing reaction can be completed uniformly.

The another photosensitive composition according to the present invention can be cured even if the another photosensitive composition is a material blended with another polymer that becomes cloudy when blended, so that a variety of forms, such as forms of a wax, a sheet, and a tape can be taken. Thus, the another photosensitive composition according to the present invention that can directly wrap or be adhered to an object and thereby is made easy to handle can replace a conventional photosensitive composition that is applied on an object with the use of a dispenser.

Because the another cured product according to the present invention is made from the photosensitive composition that contains the ultraviolet transmission inhibitor described above and is cured by the ultraviolet curing reaction, the another cured product containing the ultraviolet transmission inhibitor such as an organic/inorganic filler, a carbon/metallic particle, short/long fiber, polymer/oligomer, and another modifying additive in the material composition can be obtained by the ultraviolet curing reaction. Thus, the cured product is capable of displaying favorable physical properties by being cured as a whole in a convincing way Because the method for curing a photosensitive composition that contains the ultraviolet curable material and the chain transfer agent according to the present invention includes making the chain transfer agent transfer the curable activated species that is generated when the photosensitive composition is irradiated with the ultraviolet light to the site in the photosensitive composition where the irradiation light does not reach, and chain curing the photosensitive composition whether or not the ultraviolet transmission inhibitor that inhibits ultraviolet transmission exists in the photosensitive composition, the photosensitive composition can be cured to its deep portion whether or not the ultraviolet transmission inhibitor exists in the photosensitive composition.

In addition, a blended material prepared by adding a polymer to the photosensitive composition according to the present invention can be cured, so that the photosensitive composition before curing can be made into the forms of a wax, a sheet, and a tape. Thus, the photosensitive composition that can directly wrap or be adhered to an object and thereby is made easy to handle can replace a conventional photosensitive composition that is applied on an object with the use of a dispenser. In addition, a portion of the photosensitive composition that the irradiation light does not reach can be cured in a convincing way. Thus, even when the photosensitive composition is formed into the shape including a portion shadowed in the light irradiation, which is the case where the photosensitive composition cannot be used conventionally, the shadowed portion can be cured in a convincing way. Thus, the shape of a cured product is not limited, and cured products having a wide variety of shapes can be cured.

Because the another photosensitive composition according to the present invention contains the polyisocyanate compound having two or more isocyanate groups, the (meth)acrylate of the polyol having one or less hydroxyl group, the number of which is set by ester bonding two or more hydroxyl groups of and the polyol having two or more hydroxyl groups with the (meth)acrylate, and the ultraviolet polymerization initiator, a portion of the another photosensitive composition that light does not reach (dark portion) can be cured while the another photosensitive composition maintains the advantage of an ultraviolet curing property of being curable in a short time.

In addition, because the cured product according to the present invention is made from the photosensitive composition described above that is cured, a portion of the cured product that ultraviolet light does not reach can be cured sufficiently, so that the cured product has an excellent curing property.

EMBODIMENTS FOR CARRYING OUT THE INVENTION

Figure 1:
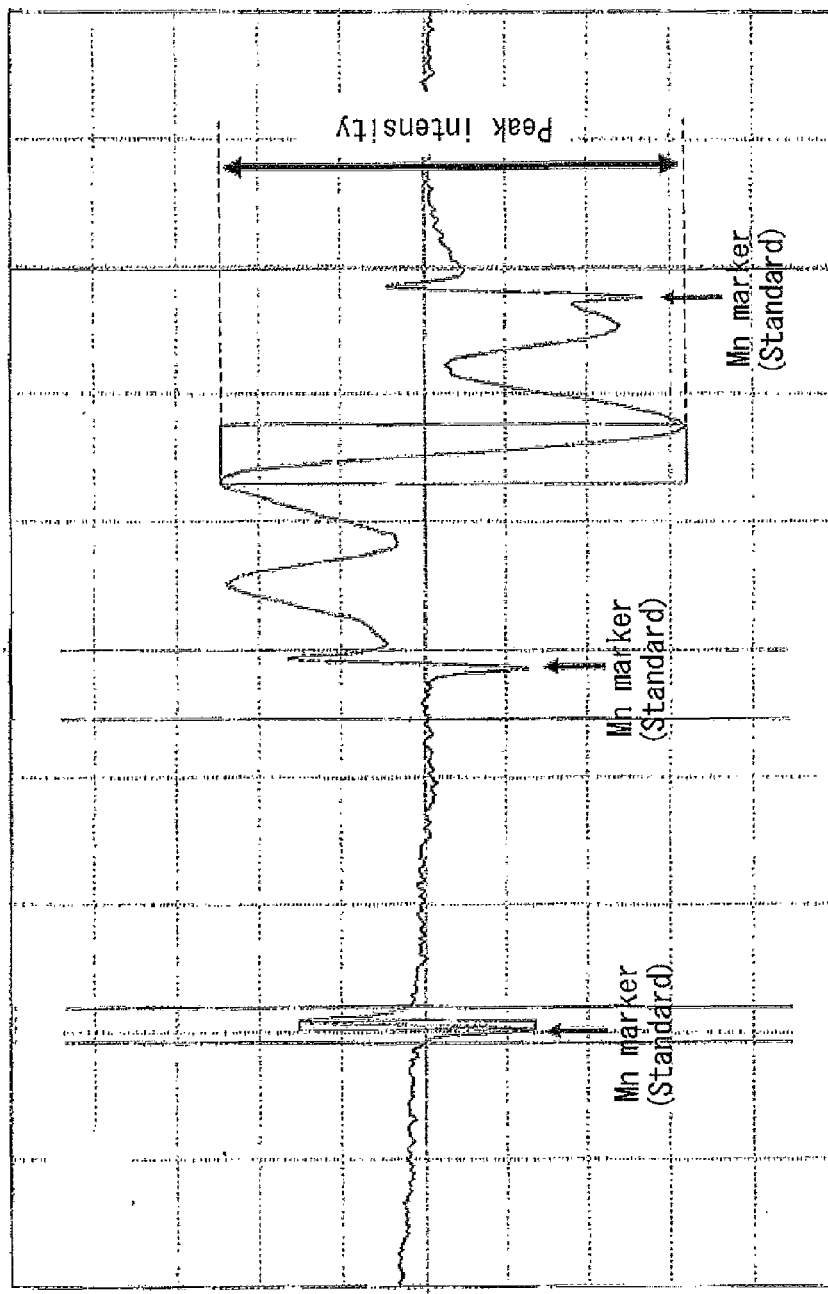
FIG. 1 is a chart showing a result of ESR measurement of a chain transfer agent (B-2).

Hereinafter, a detailed description according to preferred embodiments of the present invention will be provided. A chain transfer agent according to a preferred embodiment of the present invention contains an ingredient (a) that defines a compound having nitrogen atoms and oxygen atoms and containing one or more pieces of at least one kind selected from the group consisting of a urethane bond, a urea bond, and an isocyanate group in its molecules (also referred to as a compound containing one or more pieces of a urethane bond, a urea bond, and an isocyanate group), and an ingredient (b) that defines a metal-containing compound.

By being added to a radical polymerizable material, the chain transfer agent according to the present invention instantaneously is capable of transferring radicals to a site in the radical polymerizable material where radicals are not generated, and initiating to progress a polymerization reaction at the site. To be specific, the chain transfer agent according to the present invention is used by being added to a radical polymerizable material, and is capable of improving a curing property of the radical polymerizable material. An ultraviolet curable material is preferably used as the radical polymerizable material.

As the ingredient (a) that defines the compound containing one or more pieces of the urethane bond, the urea bond, and the isocyanate group, a conventionally known compound can be used without limitation as long as the compound contains one or more pieces of at least one kind selected from the group consisting of a urethane bond indicated by the (formula 1) below, a urea bond indicated by the (formula 2) below, and an isocyanate group indicated by the (formula 3) below in its molecules.

—NH—COO—  (Formula 1)

—NH—CO—NH—  (Formula 2)

—N=C=O  (Formula 3)

Specific examples of the compound containing one or more pieces of the urethane bond, the urea bond, and the isocyanate group include polyurethane of a variety of kinds, polyurea of a variety of kinds, and an isocyanate-containing compound. Each of the polyurethane of a variety of kinds and the polyurea of a variety of kinds is obtained by reacting the following isocyanate-containing compound, hydroxyl group (—OH)-containing compound, and amine (—NH2) containing compound.

A compound containing the above-described isocyanate group indicated by the (formula 3) can be used as it is as the isocyanate-containing compound. Alternatively, the isocyanate-containing compound can be used as polyurethane of a variety of kinds and polyurea of a variety of kinds by being reacted with the following hydroxyl group-containing compound and amine containing compound.

Examples of the isocyanate-containing compound include compounds such as an aliphatic isocyanate including a methylene diisocyanate, an ethylene diisocyanate, a tetramethylene diisocyanate, a hexamethylene diisocyanate (HDI), a dodecamethylene diisocyanate, a 2,2,4-trimethylhexane methylene diisocyanate, a lysine diisocyanate (LDI), and a 1,3,6-hexamethylene triisocyanate, compounds such as an alicyclic isocyanate including a hydrogenated-4,4'-diphenyl methane diisocyanate (hydrogenated MDI), a hydrogenated-xylylene diisocyanate (hydrogenated XDI), a 1,4-cyclohexane diisocyanate, a hydrogenated-2,4-tolylenediisocyanate (hydrogenated TDI), an isophorone diisocyanate (IPDI), and a norbornene diisocyanate (NBDI), compounds such as an aromatic aliphatic isocyanate including a xylylene diisocyanate (XDI), and a tetramethylene xylylene diisocyanate (TMXDI), and compounds such as a polyisocyanate such as aromatic isocyanate including a 1,4-diphenyl diisocyanate, a 2,4 or 2,6-tolylenediisocyanate (TDI), a 2,4 or 4,4-diphenyl methane diisocyanate (MDI), a 1,5-naphthalene diisocyanate (NDI), a 3,3'-dimethyl-4,4'-diphenyl methane diisocyanate, an O-tolidine diisocyanate, a polyphenyl methane polyisocyanate (crude MDI), a triphenyl methane triisocyanate, and a tris(isocyanatophenyl) thiophosphate, and further include biuret type isocyanates that are obtained by reacting these polyisocyanates with water, adduct type polyisocyanates that are obtained by reacting these polyisocyanates with polyvalent alcohol such as trimethylolpropane, a liquid prepolymer that is obtained by polymerizing a portion of a polyvalent isocyanate with polyester or a polyether derivative, and polymers that are obtained by isocyanurating these polyisocyanates. Among these isocyanate-containing compounds, a single kind of isocyanate-containing compound may be used alone, or two or more kinds of isocyanate-containing compounds may be used in combination.

Examples of the hydroxyl group-containing compound that is reacted with the isocyanate-containing compound in order to obtain polyurethane of a variety of kinds include alcohols with carbon chains having 1 to 30 carbon atoms having hydroxyl groups at their terminals, (poly)ethylene glycol of terminal diol, (poly)propylene glycol of terminal diol, (poly)hexamethylene glycol of terminal diol, (poly) caprolactone of terminal diol, (poly)ester (poly)ol of terminal diol, (poly)amide of terminal diol, and (poly)ester of terminal dial.

The polyurethane of a variety of kinds does not have to be in the form of a liquid as long as the polyurethane of a variety of kinds is dissolved or in a suspended form when blended finally in the curable material; however, it is preferable that the polyurethane of a variety of kinds should be in the form of a liquid from the viewpoint of easy blending, and that a liquid compound having a molecular weight equal to or less than 100,000 should be used as the hydroxyl group-containing compound when using the polyurethane of a variety of kinds in the form of a liquid.

Examples of the amine containing compound that is reacted with the isocyanate-containing compound in order to obtain polyurea of a variety of kinds include amines with carbon chains having 1 to 30 carbon atoms having primary or secondary amino group at their terminals, (poly)ethylene glycol of terminal diamine, (poly)propylene glycol of terminal diamine, (poly)hexamethylene glycol of terminal diamine, (poly) caprolactone of terminal diamine, (poly) ester (poly)ol of terminal diamine, (poly)amide of terminal diamine, and (poly)ester of terminal diamine.

The polyurea of a variety of kinds does not have to be in the form of a liquid as long as the polyurea of a variety of kinds is dissolved or in a suspended form when blended finally in the curable material; however, it is preferable that the polyurea of a variety of kinds should be in the form of a liquid from the viewpoint of easy blending, and that a liquid compound having a molecular weight equal to or less than 100,000 should be used as the amine containing compound when using the polyurea of a variety of kinds in the form of a liquid.

In addition, it is preferable that the terminal groups in the polyurethane compound and the polyurea compound should be sealed with an alkyl group, a (meth)acrylic group, an epoxy group, an oxazolyl group, a carbonyl group, a thiol group, a thioether group, a thioester group, an (ester) phosphate group, a phosphonate (ester) group, and a carboxylate (ester) group by (thio)ether, (thio)ester,amido, (thio)urethane, (thio)urea and an N-alkyl link as necessary.

It is also preferable that the urethane bond, the urea bond, and the isocyanate group should be contained in molecules while a plurality of kinds of the urethane bond, the urea bond, and the isocyanate group are bonded, or while the terminal groups of the urethane bond, the urea bond, and the isocyanate group are combined.

It is preferable that one kind or a plurality of metals selected from the group consisting of tin, copper, zinc, cobalt, and nickel should be used as the metal-containing compound of the ingredient (b) that is combined with the compound containing one or more pieces of the urethane bond, the urea bond, and the isocyanate group to make up the chain transfer agent. A conventionally known metal-containing compound can be used as the metal-containing compound of the ingredient (b) without special limit as long as the one kind or the plurality of metals described above are contained in molecular in the form of metal salt or metal complex.

Examples of the metal salt include metal salts in the form of carboxylate salt, phosphoric salt, salt of sulfonic acid, hydrochloride salt, bromate salt, and (per) chlorate, and chlorite of the above descried metals A conventionally known metal complex can be used as the metal complex without special limit as long as the metal complex is coordinated at 1:1 to 1:4 (metal: ligand) with an organic ligand that can be coordinated with the above-described metals and is stabilsed.

Specific examples of the metal-containing compound of the ingredient (b) include bis(2,4-pentanedionato)tin, dibutyltin bis(trifluoromethanesulfonate), dibutyltin diacetate, dibutyltin dilaurate, dibutyltin maleate, phthalocyaninetin (IV)dichloride, tetrabutyl ammonium difluoro triphenyltin, tin(II) phthalocyanine, tributyl(2-pyridyl)tin, tributyl(2-thienyl)tin, tributyltin acetate, tributyl(trimethylsilylethinyl)tin, trimethyl(2-pyridyl)tin, bis(hexafluoroacetylacetonato)copper(II) salt, bis(2,4-pentanedionato)copper(II), bis(1,3-propanediamine)copper(II)dichloride, bis(8-quinolinolate)copper(II), bis(trifluoro-2,4-pentanedionato)copper(II), copper (II)bis(2-hydroxyethyl)dithiocarbamate, copper diethyldithiocarbamate, copper(II) dimethyldithiocarbamate, ethylenediaminetetraacetic acid copper(II)disodium salt, phthalocyanine copper(II), dichloro(1,10-phenanthroline)copper(II), phthalocyanine copper, tetra-4-tert-butyl-phthalocyanine copper, tetrakis(acetonitrile)copper(I) hexafluorophosphate, copper naphthenate, bis[2-(2-benzothiazolyl)phenolato]zinc(II), bis[2-(2-benzoxazolyl)phenolato]zinc(II), bis(2-hydroxyethyl)dithiocarbamic acid]zinc (II) salt, bis(2,4-pentanedionato)zinc(II), bis(8-quinolinolate)zinc(II), bis(tetrabutylammonium)bis(1,3-dithiol-2-thione-4,5-dithiolato)zinc complex, ethylenediaminetetraacetic acid disodium zinc salt, zinc(II) dibenzyldithiocarbamate, zinc(II)dibutyldithiocarbamate, zinc diethyldithiocarbamate, zinc dimethyldithiocarbamate, phthalocyanine zinc, zinc naphthenate, bis(cyclopentadienyl)cobalt(III) hexafluorophosphate, [1,1'-bis(diphenylphosphino)ferrocene]cobalt(II)dichloride, bis(hexafluoroacetylacetonato)cobalt(II), (1R,2R)—N,N'-bis[3-oxo-2-(2,4,6-trimethylbenzoyl) butylidene]-1,2-diphenylethylenediaminato cobalt(II), (1S,2S)—N,N'-bis[3-oxo-2-(2,4,6-trimethylbenzoyl) butylidene]-1,2-diphenylethylenediaminato cobalt(II), bis(2,4-pentanedionato)cobalt(II), bis(trifluoro-2,4-pentanedionato) cobalt(II), phthalocyanine cobalt(II), ethylenediaminetetraacetic acid disodium cobalt salt, hexamminecobalt(III) chloride, N,N'-disalicylalethylenediamine cobalt(II), [5,10,15,20-tetrakis(4-methoxyphenyl) porphyrinato]cobalt(11), tris(2,4-pentanedionato)cobalt (III), cobalt naphthenate, [1,2-bis(diphenylphosphino)ethane]nickel(II) dichloride, bis(dithiobenzil)nickel(II), bis (hexafluoroacetylacetonato)nickel(II), bis(2,4-pentanedionato)nickel(II), bis(tetrabutylammonium)bis (maleonitriledithiolato)nickel(II) complex, bis (tricyclohexylphosphine)nickel(II) dichloride, bis (triphenylphosphine)nickel(II) dichloride, bromo[(2,6-pyridinediyl)bis(3-methyl-1-imidazolyl-2-ylidene)]nickel bromide, ethylenediaminetetraacetic acid disodium nickel (II) salt, nickel(II) dibutyldithiocarbamate, and nickel diethyldithiocarbamate. Among these metal-containing compounds, a single kind of metal-containing compound may be used alone, or two or more kinds of metal-containing compounds may be used in combination.

Examples of the form of the metal-containing compound of the ingredient (b) include the forms of organic acid salt and metal complex because the metal-containing compounds in the form of organic acid salt and metal complex are easy to blend and prevent precipitation during storage while not having to have high solubility in an organic substance as long as the metal-containing compounds become uniform eventually in the radical polymerizable material.

The metal-containing compound of the ingredient (b) is capable of making up the chain transfer agent by being combined with the compound containing the urethane bond, the urea bond, or the isocyanate group of the ingredient (a).

A method for combining the ingredient (a) and the ingredient (b) is not limited specifically, and it is essential only that both the ingredients should be blended at room temperature or while heating; however it is preferable that both the ingredients should be sufficiently agitated or blended to be dissolved or uniformly dispersed with the use of an agitation equipment such as a blender at appropriate temperature under reduced pressure or in an inert gas atmosphere such as a nitrogen atmosphere.

It is preferable that the ratio between the ingredient (a) and the ingredient (b) should be within a range from (a): (b)=100:0.001 to 100:10 at amass ratio. It is more preferable that the ratio between the ingredient (a) and the ingredient (b) should be within a range from (a):(b)=100:0.005 to 100:5 at a mass ratio. When the content of the metal-containing compound of the ingredient (b) is too large, the metal-containing compound becomes an insoluble matter to precipitate while the prepared chain transfer agent is stored, and when the insoluble matter remains in a reactant (polymerized material) of the radical polymerizable material, the physical properties of the polymerized material could be lost. In addition, because the ingredient (b) inhibits transmission of ultraviolet light when added to the ultraviolet curable material, the too large content of ingredient (b) could inhibit a curing reaction. On the other hand, when the content of the ingredient (b) is too small, the chain transfer agent cannot function perfectly as a complex to have a reduced function.

It is preferable that the chain transfer agent according to the present invention should not contain a group having sulfur atoms such as a mercapto group and a disulfide group. This is because when the chain transfer agent is made up from a compound that does not contain sulfur atoms, there is not a problem of malodor when the compound is added to the radical polymerizable material.

It is preferable that the chain transfer agent according to the present invention further contains various kinds of additives as necessary within a range of not impairing the object of the present invention. Examples of the additives include a stabilizer, a plasticizer, a softener, a coloring pigment, a colorant, an antistatic agent, a flame retardant, a sensitizer, a dispersing agent, a solvent, antibacterial agent, and a fungicide.

Examples of the stabilizer include an antiaging agent, an antioxidant, and a dehydrating agent. Specific examples of the plasticizer include a hindered phenol compound, a hindered amine compound (antiaging agent), butylhydroxytoluene, butylhydroxytoluene, butylhydroxyanisole, triphenyl phosphite (antioxidant), and an acid chloride such as a maleic acid anhydride, an acid phthalic anhydride, a benzophenonetetracarboxylic dianhydride, calcined lime, a carbodiimide derivative, and oxychloride such as a stearyl chloride (dehydrating agent). In addition, a small amount of polymerization inhibitor such as methoquinone can be used as the stabilizer.

It is to be noted that most of the stabilizers described above have a negative influence on the radical chain, so that it is preferable to add an extremely small amount of stabilizer.

Examples of the plasticizer include dioctyl adipate, dibutyl sebacate, diethylhexyl sebacate, isodecyl succinate, diethylene glycol benzoate, a pentaerythritol ester, a butyl oleate, a methyl acetyl ricinolate, a tricresyl phosphate, a trioctyl phosphate, propylene adipate glycol polyester, butylene adipate glycol polyester, phenol, laurate, stearic acid, a docosanoic acid, a paraffinic oil, a napthenic oil, and an aromatic oil.

Examples of the softener include vinyl group-containing lactam such as N-vinyl pyrrolidone and N-vinylcaprolactam, hydroxyl butyl vinyl ether, lauryl vinyl ether, cetyl vinyl ether, and 2-ethylhexyl vinyl ether.

Examples of the coloring pigment include an inorganic coloring pigment such as titanium dioxide, zinc oxide, ultramarine, colcothar, lithopone, lead, cadmium iron, cobalt, aluminum, hydrochloride and sulfate salt, and an organic coloring pigment such as an azo pigment and a copper phthalocyanine pigment.

Examples of the antistatic agent include a hydrophilic compound such as quaternized ammonium salt, polyglycol, and an ethylene oxide derivative.

Examples of the flame retardant include a chloroalkyl phosphate, a dimethyl methyl phosphonate, a bromine/phosphorous compound, an ammonium polyphosphate, neopentyl bromide-polyether, and brominated polyether.

Examples of the sensitizer include dimethylformamide, N-methylpyrrolidone, triethylamine, diethylamine, N-methyldiethanolamine, ethanolamine, 4-dimethylaminobenzoic acid, methyl 4-dimethylamino benzoate, ethyl 4-dimethylamino benzoate, isoamyl 4-dimethylamino benzoate, and UBECRIL P102, 103, 104 and 105 (manufactured by UCB JAPAN CO. LTD.) that are commercialized products.

Examples of the dispersing agent include a surface acting agent such as polyoxyethylene nonylphenyl ether, and polyethylene glycol octylphenyl ether.

Examples of the solvent include any solvent as long as the solvent dissolves the chain transfer agent to reduce the viscosity of the chain transfer agent, or to increase the compatibility of the chain transfer agent. Specific examples of the solvent include a polar solvent such as tetrahydrofuran, dimethylformamide, ethyl acetate and methyl ethyl ketone, and a chlorinated solvent such as dichloroethane and trichlorobenzene.

The additives of the variety of kind described above can be used in combination. A method for blending the additives is not limited specifically: however, it is preferable that the additives should be sufficiently agitated or blended to be dissolved or uniformly dispersed with the use of an agitation equipment such as a blender under reduced pressure or in an inert gas atmosphere such as a nitrogen atmosphere. In addition, it is also preferable that the additives should be added to a photosensitive composition without being added to the chain transfer agent.

Hereinafter, a description of a photosensitive composition according to the present invention will be provided. The photosensitive composition contains (A) an ultraviolet curable material, and the chain transfer agent described above, and a portion of the composition where irradiation light such as ultraviolet light for curing the composition does not reach is curable. A known ultraviolet curable material can be used as (A) the ultraviolet curable material. To be specific, the ultraviolet curable material contains a basic composition that defines a blended material containing a curable monomer and oligomer such as liquid (meth)acrylate, and a photo polymerization initiator, and any ultraviolet curable material can be used as the ultraviolet curable material as long as a cured product of the photosensitive composition can be obtained by irradiating the photosensitive composition with ultraviolet light. It is to be noted that "(meth)acrylate" defines both methacrylate and acrylate in the present invention. According to the curing principle of the ultraviolet curable material, the photo polymerization initiator absorbs the ultraviolet light to generate an activated species such as a radical species, and the activated species radical polymerizes the carbon-carbon double bonds of the (meth)acrylate to cure the (meth)acrylate.

It is preferable that the ratio between (A) the ultraviolet curable material and (B) the chain transfer agent should be within a range from (A):(B)=90:10 to 10:90 at a mass ratio. It is more preferable that the ratio between (A) the ultraviolet curable material and (B) the chain transfer agent should be within a range from (A):(B)=80:20 to 20:80 at a mass ratio. When the content of (B) the chain transfer agent is too large, the material ratio relating to ultraviolet curing becomes relatively small, and a sufficiently cured product cannot be obtained. On the other hand, when the content of (B) the chain transfer agent is too small, chain transfer capability becomes insufficient, so that the function of curing a dark portion of the ultraviolet curable material could be insufficient.

Hereinafter, a detailed description of the ultraviolet curable material will be provided. The liquid (meth)acrylate compound is not limited specifically, and a conventionally known liquid (meth)acrylate compound can be used as long as the liquid (meth)acrylate compound is a compound that contains one or more (meth)acrylates in its molecules.

Specific examples of the (meth)acrylate described above include mono(meth)acrylate such as isobornyl(meth)acrylate, bornyl(meth)acrylate, tricyclodecenyl(meth)acrylate, dicyclopentanyl(meth)acrylate, dicyclopentenyl(meth)acrylate, cyclohexyl(meth)acrylate, (meth)acrylic acid, benzyl (meth)acrylate, 4-butylcyclohexyl(meth)acrylate, (meth)

acryloylmorpholine, 2-hydroxyethyl(meth)acrylate, 2-hydroxypropy(meth)acrylate, 4-hydroxybutyl(meth)acrylate, methyl(meth)acrylate, ethyl(meth)acrylate, propyl (meth)acrylate, isopropyl(meth)acrylate, octyl(meth)acrylate, isooctyl(meth)acrylate, nonyl(meth)acrylate, decyl (meth)acrylate, undecyl(meth)acrylate, dodecyl(meth) acrylate, lauryl(meth)acrylate, stearyl(meth)acrylate, isostearyl(meth)acrylate, tetrahydrofurfuryl(meth)acrylate, polyethylene glycol mono(meth)acrylate, polypropylene glycol mono(meth)acrylate, methoxyethylene glycol(meth) acrylate, ethoxy ethyl(meth)acrylate, methoxy polyethylene glycol(meth)acrylate, methoxy polypropylene glycol(meth) acrylate, polyoxyethylene nonylphenyl ether acrylate, diacetone(meth)acrylamide, isobutoxymethyl(meth)acrylamide, N,N-dimethyl(meth)acrylamide, t-octyl(meth)acrylamide, dimethylaminoethyl(meth)acrylate, diethylaminoethyl (meth)acrylate, 7-amino-3,7-dimethyloctyl(meth)acrylate, N,N-diethyl(meth)acrylamide, and N,N-dimethyl aminopropyl(meth)acrylamide, and poly(meth)acrylate such as butanediol di(meth)acrylate, hexanediol di(meth)acrylate, nonanediol di(meth)acrylate, decanediol di(meth)acrylate, 2-butyl-2-ethyl-1,3-propane diol di(meth)acrylate, 2-hydroxy-3-acryloxy propyl methacrylate, dipropylene glycol di(meth)acrylate, tripropylene glycol di(meth)acrylate, triethylene glycol di(meth)acrylate, tetraethylene glycol di(meth)acrylate, tricyclodecan dimethylol di(meth)acrylate, 1,4-butanepolyoldi(meth)acrylate, 1,6-hexanepolyoldi (meth)acrylate, neopentyl glycol di(meth)acrylate, polyethylene glycol di(meth)acrylate, polypropylene glycol di(meth)acrylate, 9,9-bis[4-(2-acryloyloxyethoxy)phenyl] fluorine, polyester di(meth)acrylate, tris(2-hydroxyethyl) isocyanurate tri(meth)acrylate, tris(2-hydroxyethyl)isocyanuratedi(meth)acrylate, tricyclodecan dimethylol di(meth) acrylate, an EO adduct of bisphenol A di(meth)acrylate, an EO adduct or a PO adduct of hydrogenated bisphenol A di(meth)acrylate, epoxy(meth)acrylate obtained by adding (meth)acrylate to diglycidyl ether of bisphenol A, triethylene glycol divinylether substance, trimethylolpropane tri(meth) acrylate, pentaerythritol tri(meth)acrylate, trimethylolpropane EO adduct tri(meth)acrylate, tisacryloyloxyethyl phosphate, pentaerythritol tetra(meth)acrylate, tetrafurfuryl alcohol oligo(meth)acrylate, ethyl carbitol oligo(meth)acrylate, 1,4-butanediol oligo(meth)acrylate, 1,6-hexanediol oligo(meth)acrylate, trimethylolpropane oligo(meth)acrylate, pentaerythritol oligo(meth)acrylate, (poly)urethane(meth) acrylate, and (poly)butadiene(meth)acrylate. Among these (meth)acrylate, a single kind of (meth)acrylate may be used alone, or two or more kinds of (meth)acrylates may be used in combination.

A polymeric photoinitiator can be added to the photosensitive composition. The photo polymerization initiator is not limited specifically, and a conventionally known photo polymerization initiator can be used as long as the photo polymerization initiator is a compound capable of absorbing ultraviolet light to initiate radical polymerization.

Specific examples of the photo polymerization initiator include 1-hydroxycyclohexyl phenyl ketone, 2,2-dimethoxy-2-phenylacetophenone, xanthone, fluorenone, benzaldehyde, fluorene, anthraquinone, ethyl anthraquinone, triphenylamine, carbazole, 3-methylacetophenone, 4-chlorobenzophenone, 4,4'-dimethoxybenzophenone, 4,4'-diaminobenzophenone, Michler's Ketone, benzoin propyl ether, benzoin ethyl ether, benzoin methyl ketal, 1-(4-isopropylphenyl)-2-hydroxy-2-methylpropane-1-on, 2-hydroxy-2-methyl-1-phenylpropane-1-on, thioxanthone, diethyl thioxanthone, 2-isopropylthioxanthone, 2-chlorothioxanthone, 2-methyl-1-[4-(methylthio)phenyl]-2-morpholino-propane-1-on, 2,4,6-trimethyl benzoyl diphenyl phosphine oxide, and bis-(2,6-dimethoxy benzoyl)-2,4,4-trimethylpentyl phosphine oxide. Among these photo polymerization initiators, a single kind of photo polymerization initiator may be used alone, or two or more kinds of photo polymerization initiators may be used in combination.

Commercialized products such as IRGACURE 184, 369, 651, 500, 907, CGI1700, CGI1750, CGI1850, CG24-61; DAROCURE 1116, 1173, lucirinTPO (manufactured by BASF), and UBECRIL P36 (manufactured by UCB JAPAN CO. LTD.) can be used as the photo polymerization initiator.

The photosensitive composition can contain, in addition to (A) the ultraviolet curable material and (B) the chain transfer agent, various kinds of additives as necessary within a range of not impairing the object of the present invention in order to obtain functions of a cured product. Examples of the additives include a stabilizer, a plasticizer, a softener, a coloring pigment, a colorant, an antistatic agent, a flame retardant, an adhesion-imparting agent, a sensitizer, a dispersing agent, a solvent, antibacterial agent, and a fungicide. Same additives exemplified as the additives for the chain transfer agent can be used as the additives for photosensitive composition. It is to be noted that most of the stabilizers described above have a negative influence on the radical chain reaction, so that it is preferable to add an extremely small amount of stabilizer.

In particular, it is preferable that the photosensitive composition should contain (C) an ultraviolet transmission inhibitor arranged to inhibit ultraviolet transmission as the above-described additive. Examples of the ultraviolet transmission inhibitor include i) an ultraviolet transmission inhibitor arranged to shield an optical path or scatter light such as an organic/inorganic filler; talc, silica, a clay, calcium carbonate, and melamine, ii) an ultraviolet transmission inhibitor arranged to shield an optical path such as a carbon/metallic particle; activated carbon, a carbon nanofiller, and a copper powder, iii) an ultraviolet transmission inhibitor arranged to shield an optical path or scatter light such as short/long fiber; potassium titanate, carbon fiber, and glass fiber, iv) an ultraviolet transmission inhibitor arranged to scatter light, refract an optical path, or absorb ultraviolet light such as a polymer/oligomer; polyvinyl chloride, an acrylate resin, an elastomer, and rubber, and v) an ultraviolet transmission inhibitor arranged to shield an optical path, scatter light, or absorb ultraviolet light such as another modifying additive; hydrotalcite, phosphate, borate, and brominated aromatic series.

These substances are added as appropriate in accordance with the intended purpose or desired physical properties of the photosensitive composition. The substance that is infilled or blended in the photosensitive composition in order to provide functions of a cured product is not limited specifically; however, it is preferable that the substance itself should be high in stability from the viewpoint of the intended purpose.

The photosensitive composition can be prepared by blending (A) the ultraviolet curable material, (B) the chain transfer agent, (C) the ultraviolet transmission inhibitor, and the additives. The method for blending these ingredients is not limited specifically; however a method for sufficiently agitating or blending these ingredients to dissolve or uniformly disperse with the use of an agitation equipment such as a blender at appropriate temperature under reduced pressure or in an inert gas atmosphere such as a nitrogen atmosphere is preferably used.

A cured product according to the present invention the photosensitive composition described above that is cured by being irradiated with ultraviolet light.

A method for curing a photosensitive composition that contains an ultraviolet curable material and a chain transfer agent includes making the chain transfer agent transfer a curable activated species that is generated when the photosensitive composition is irradiated with ultraviolet light to a site in the photosensitive composition where the irradiation light does not reach, and chain curing the photosensitive composition whether or not an ultraviolet transmission inhibitor that inhibits ultraviolet transmission exists in the photosensitive composition.

It is also preferable to use visible light instead of ultraviolet light as the irradiation light in the curing. A variety of conventionally known irradiation devices can be used as a UV light irradiation device. In addition, the conditions for the ultraviolet irradiation can be determined as appropriate in accordance with the ultraviolet curable material.

Even in the case of using the photosensitive composition containing (C) the ultraviolet transmission inhibitor, the photosensitive composition can be cured to the inside with the use of an ultraviolet curing reaction by irradiating the photosensitive composition with ultraviolet light irradiation because the chain transfer agent is contained in the photosensitive composition.

In addition, because the chain transfer agent is contained in the photosensitive composition, cured products having a wide variety of shapes can be obtained even when the cured products have shapes such that irradiation light does not reach the cured products.

EXAMPLE

Hereinafter, a description of the present invention will now be specifically provided with reference to Examples and Comparative Examples. The present invention is not limited to these Examples.

Examples 1 to 11, Comparative Examples 1 and 2

Chain transfer agents according to Examples 1 to 11 and materials according to Comparative Examples 1 and 2 are shown in Table 1. The chain transfer agents according to Examples 1 to 12 (B-1 to B12) shown in Table 1 were obtained by preparing the ingredients having the compositions (parts by mass) shown in Table 1, blending the ingredients with the use of an agitation equipment to dissolve or disperse the ingredients. In addition, Comparative Examples 1 and 2 (X-1 and X-2) were obtained by preparing the ingredients (a) without metal-containing compounds contained therein.

TABLE 1

| Composition of chain transfer agent (Parts by mass) | | Example | | | | | | | | | | | | Comparative Example | |
|---|---|---|---|---|---|---|---|---|---|---|---|---|---|---|---|
| | | 1 | 2 | 3 | 4 | 5 | 6 | 7 | 8 | 9 | 10 | 11 | 12 | 1 | 2 |
| | Brevity code | B-1 | B-2 | B-3 | B-4 | B-5 | B-6 | B-7 | B-8 | B-9 | B-10 | B-11 | B-12 | X-1 | X-2 |
| Ingredient (a) | | | | | | | | | | | | | | | |
| Containing a urethane bond | UP-1 | 100 | | | | | | | | | | | | | |
| | UP-2 | | 100 | | | 100 | 100 | 100 | 100 | 100 | 100 | 100 | 100 | 100 | |
| Containing a urea bond | UP-3 | | | 100 | | | | | | | | | | | |
| Containing an isocyanate group | N3600 | | | | 100 | | | | | | | | | | 100 |
| Ingredient (b) | | | | | | | | | | | | | | | |
| metal-containing compound | BPDZ | 0.1 | 0.1 | 0.1 | 0.1 | | | | | 0.001 | 10 | 0.0005 | 15 | | |
| | CDEDTC | | | | | 0.1 | | | | | | | | | |
| | DBTDL | | | | | | 0.1 | | | | | | | | |
| | BPDC | | | | | | | 0.1 | | | | | | | |
| | BTCN | | | | | | | | 0.1 | | | | | | |

The brevity codes shown in Table 1 are described below. The brevity codes with no specific indication of a manufacture are reagent grades manufactured by TOKYO CHEMICAL INDUSTRY CO., LTD.

The ingredient (a): a compound containing a urethane bond
UP-1: a synthetic compound (Synthetic example 1 will be described later)
UP-2: a synthetic compound (Synthetic example 2 will be described later)

The ingredient (a): a compound containing a urea bond
UP-3: a synthetic compound (Synthetic example 3 will be described later)

The ingredient (a): a compound containing an isocyanate group
N3600: manufactured by SUMIKA BAYER URETHANE CO. LTD., product name "DESMODUR N3600" (the commercialized product was used as the compound containing an isocyanate group.)

Synthetic Example 1

Synthesis of UP-1

80 g (200 mmol) of polypropylene glycol having a number average molecular weight of 400, 40 g (238 mmol) of hexamethylene diisocyanate, and 0.05 g of dibutyltin dilaurate were put in a reaction container with an agitation equipment, and the liquid temperature of the mixture was heated up to 50 degrees C. from a room temperature for one hour while agitating the mixture. Then, while a small amount of the mixture was sampled to measure its FT-IR to check absorption of an isocyanate group in the vicinity of 2300 cm−1, the agitation was continued at 50 degrees C. The content of the residual isocyanate group was calculated based on the absorption area of FT-IR. The moment when the content decreased down to about 15% compared with the content before the reaction and no change was seen was regarded as the completion of the reaction. Thus, a clear and colorless viscous liquid was obtained. This liquid was determined as UP-1. UP-1 defines a compound containing a urethane bond that has a number average molecular weight of 3200 and has an isocyanate group at its terminal.

Synthetic Example 2

Synthesis of UP-2

100 g (33 mmol) of UP-1, 8.2 g (70.6 mmol) of 2-hydroxyethyl acrylate, 0.05 g of dibutyltin dilaurate, and 0.02 g of pentaerythritol tetrakis[3-(3,5-di-tert-butyl-4-hydroxyphenyl)pro pionate] were put in a reaction container with an agitation equipment, and the liquid temperature of the mixture was heated up to 50 degrees C. from a room temperature for one hour while agitating the mixture. Then, while a small amount of the mixture was sampled to measure its FT-IR to check absorption of an isocyanate group in the vicinity of 2300 cm−1, the agitation was continued at 50 degrees C. The content of the residual isocyanate group was calculated based on the absorption area of FT-IR. The moment when the absorption disappeared was regarded as the completion of the reaction. Thus, a clear and colorless viscous liquid was obtained. This liquid was determined as UP-2. UP-2 defines a compound containing a urethane bond that has a number average molecular weight of 3200 and has an acrylate group at its terminal.

Synthetic Example 3

Synthesis of UP-3

40 g (208 mmol) of 1,11-diamino-3,6,9-trioxaundecane, and 42 g (250 mmol) of hexamethylene diisocyanate were put in a reaction container with an agitation equipment, and the liquid temperature of the mixture was heated up to 50 degrees C. from a room temperature for one hour while agitating the mixture. Then, while a small amount of the mixture was sampled to measure its FT-IR to check absorption of an isocyanate group in the vicinity of 2300 cm−1, the agitation was continued at 50 degrees C. The content of the residual isocyanate group was calculated based on the absorption area of FT-IR. The moment when the content decreased down to about 15% compared with the content before the reaction and no change was seen was regarded as the completion of the reaction. Thus, a clear and colorless viscous liquid was obtained. This liquid was determined as UP-3. UP-3 defines a compound containing a urea bond that has a number average molecular weight of 2000 and had an isocyanate group at its terminal.
  The ingredient (b): a metal-containing compound
  BPDZ: bis(2,4-pentanedionato)zinc(II)
  CDEDTC: zinc (II) diethyldithiocarbamate
  DBTDL: dibutyltin dilaurate
  BPDC: bis(2,4-pentanedionato)cobalt(II)
  BTCN: nickel (II) dibutyldithiocarbamate Examples 2-1 to 2-19, Comparative Examples 2-1 to 2-6

Hereinafter, Examples and Comparative Examples of the photosensitive compositions are shown. The ultraviolet curable materials (A-1 to A-4) shown in Table 2 were used for Examples and Comparative Examples of the photosensitive compositions.
  The ingredients shown in Table 2 are described below.
  [(Meth)acrylate]
  IBA: isobornyl acrylate
  DPGA: dipropylene glycol diacrylate
  UP-2: a synthetic compound (described in Synthetic example 2)

[Ultraviolet(photo) Polymerization Initiator]
HCHPK: 1-hydroxycyclohexyl phenyl ketone
EANT: 2-ethyl anthraquinone

TABLE 2

| | | Composition of an ultraviolet curable material (Parts by mass) | | | |
|---|---|---|---|---|---|
| | | A-1 | A-2 | A-3 | A-4 |
| (Meth)acrylate | IBA | 100 | | | |
| | DPGA | | 100 | | 100 |
| | UP-2 | | | 100 | |
| Photo polymerization initiator | HCHPK | 2 | 2 | 2 | |
| | EANT | | | | 2 |

The photosensitive compositions according to Examples 2-1 to 2-19 were prepared by adding the chain transfer agents according to Examples 1 to 12 (B-1 to B-12) having the respective contents shown in Table 1 to the ultraviolet curable materials of A-1 to A-4 shown in Table 2, and tests to evaluate a curing property were performed on the photosensitive compositions. In addition, Comparative Examples 2-1 to 2-6 were prepared from the materials shown in Table 4, for comparison, and tests to evaluate a curing property were performed on Comparative Examples 2-1 to 2-6.

Comparative Example 2-1

The test was performed on Comparative Example 2-1 that was made only from the ultraviolet curable material of A-2 shown in Table 2.

Comparative Example 2-2

The test was performed on Comparative Example 2-2 that was made only from the chain transfer agent (B-1) according to Example 2.

Comparative Example 2-3

The test was performed on Comparative Example 2-3 in a same manner as the test on Example 2-2 except that Comparative Example 2-3 was made from the material according to Comparative Example 1 (X-1) instead of using the chain transfer agent (B-2) according to Example 2-2.

Comparative Example 2-4

The test was performed on Comparative Example 2-4 in a same manner as the test on Example 2-2 except that Comparative Example 2-4 was made from the material according to Comparative Example 2 (X-2) instead of using the chain transfer agent (B-2) according to Example 2-2.

Comparative Example 2-5

The test was performed on Comparative Example 2-5 in a same manner as the test on Example 2-2 except that Comparative Example 2-5 was made from 2-mercaptobenzimidazole (MBI) that was a known chain transfer agent instead of using the chain transfer agent (B-2) according to Example 2-2. MBI is an example of a chain transfer agent containing a mercapto group that is described in Non-patent document 1 above.

Comparative Example 2-6

The test was performed on Comparative Example 2-6 in a same manner as the test on Example 2-2 except that comparative example 2-6 was made from 2,4-diphenyl-4-methyl-1-pentene (DPMP) that was a known chain transfer agent instead of using the chain transfer agent (3-2) according to Example 2-2. DPMP is an example of a chain transfer agent having an α-methylstyrene dimer structure that is described in Patent document 7 above.

Results of the tests are shown in Tables 3 and 4. Detailed descriptions of the compositions and the test method to evaluate a curing property shown in Tables 3 and 4 will be provided below.

(Test Method for Evaluating a Curing Property)

Each of the ultraviolet curable compositions was put in a glass tube having an inner diameter of 5 mm and a height of 50 mm such that the fluid level was 20 mm high, and was ultraviolet irradiated for ten seconds from the side with the use of a UV lamp (100 mW/cm2, manufactured by SEN LIGHTS CO., LTD.). Then, each of the ultraviolet curable compositions was left for one minute at room temperature, and then a glass rod having a diameter of 1.5 mm was inserted from the top to check with finger touch whether or not each of the ultraviolet curable compositions was cured. The ultraviolet curable compositions into which the glass rod could not be inserted below the fluid level were regarded as cured and rated "passed", and the ultraviolet curable compositions into which the glass rod could be easily inserted below the fluid level were regarded as uncured and rated "failed".

(Measurement Method for Measuring a Distance to a Cured Dark Portion)

Each of the ultraviolet curable compositions was put in a glass tube having an inner diameter of 5 mm and a height of 50 mm such that the fluid level was 20 mm high. The upper half (10 mm) of each content in the glass tube was wrapped with an aluminum foil to make a light-shielded portion. Then, each of the ultraviolet curable compositions was ultraviolet irradiated for ten seconds from the side with the use of a UV lamp (100 mW/cm2, manufactured by SEN LIGHTS CO., LTD.). Then, each of the ultraviolet curable compositions was left for twenty minutes at room temperature, and then a glass rod having a diameter of 1.5 mm was inserted from the top to check the cured portion, and the distance to each cured portion that proceeded to the upper portion (unirradiated portion) from the border between the ultraviolet irradiation face and the light-shielded face was measured. The evaluation to evaluate whether or not the ultraviolet curable compositions were cured was performed in a same manner as the evaluation performed in the test method for evaluating a curing property.

TABLE 3

|  |  | Example |  |  |  |  |  |  |  |  |  |
|---|---|---|---|---|---|---|---|---|---|---|---|
|  |  | 2-1 | 2-2 | 2-3 | 2-4 | 2-5 | 2-6 | 2-7 | 2-8 | 2-9 | 2-10 |
| Ingredient composition (Parts by mass) | | | | | | | | | | | |
| Ultraviolet curable material | A-1 | 60 | | | | | | | | | |
|  | A-2 | | 60 | | | 60 | 60 | 60 | 60 | 60 | 60 |
|  | A-3 | | | 60 | | | | | | | |
|  | A-4 | | | | 60 | | | | | | |
| Chain transfer agent | B-1 | | | | | 40 | | | | | |
|  | B-2 | 40 | 40 | 40 | 40 | | | | | | |
|  | B-3 | | | | | | 40 | | | | |
|  | B-4 | | | | | | | 40 | | | |
|  | B-5 | | | | | | | | 40 | | |
|  | B-6 | | | | | | | | | 40 | |
|  | B-7 | | | | | | | | | | 40 |
|  | B-8 | | | | | | | | | | |
|  | B-9 | | | | | | | | | | |
|  | B-10 | | | | | | | | | | |
|  | B-11 | | | | | | | | | | |
|  | B-12 | | | | | | | | | | |
| Test result | | | | | | | | | | | |
| Curing property | | Passed | Passed | Passed | Passed | Passed | Passed | Passed | Passed | Passed | Passed |
| Distance to a cured dark portion (mm) | | >9.5 | >9.5 | 8.6 | >9.5 | >9.5 | 8.6 | 9 | 7.6 | 7.3 | 6.8 |

|  |  | Example |  |  |  |  |  |  |  |  |
|---|---|---|---|---|---|---|---|---|---|---|
|  |  | 2-11 | 2-12 | 2-13 | 2-14 | 2-15 | 2-16 | 2-17 | 2-18 | 2-19 |
| Ingredient composition (Parts by mass) | | | | | | | | | | |
| Ultraviolet curable material | A-1 | | | | | | | | | |
|  | A-2 | 60 | 60 | 60 | 60 | 60 | 90 | 10 | 95 | 5 |
|  | A-3 | | | | | | | | | |
|  | A-4 | | | | | | | | | |
| Chain transfer agent | B-1 | | | | | | | | | |
|  | B-2 | | | | | | 10 | 90 | 5 | 95 |
|  | B-3 | | | | | | | | | |
|  | B-4 | | | | | | | | | |
|  | B-5 | | | | | | | | | |
|  | B-6 | | | | | | | | | |
|  | B-7 | | | | | | | | | |

TABLE 3-continued

| | | | | | | | | | |
|---|---|---|---|---|---|---|---|---|---|
| B-8 | 40 | | | | | | | | |
| B-9 | | 40 | | | | | | | |
| B-10 | | | 40 | | | | | | |
| B-11 | | | | 40 | | | | | |
| B-12 | | | | | | 40 | | | |
| Test result | | | | | | | | | |
| Curing property | Passed | Passed | Passed | Passed | Passed | Passed | Passed | Passed | Passed |
| Distance to a cured dark portion (mm) | 5.2 | 3.8 | 3.4 | 2.8 | 2.9 | 4.5 | 4.7 | 2.4 | 2.8 |

TABLE 4

| | | Comparative Example | | | | | |
|---|---|---|---|---|---|---|---|
| | | 2-1 | 2-2 | 2-3 | 2-4 | 2-5 | 2-6 |
| Ingredient composition (Parts by mass) | | | | | | | |
| Ultraviolet curable material | A-2 | 100 | | 60 | 60 | 60 | 60 |
| Chain transfer agent | B-2 | | 100 | | | | |
| | C-1 | | | 40 | | | |
| | C-2 | | | | 40 | | |
| | MBI | | | | | 40 | |
| | DPMP | | | | | | 40 |
| Test result | | | | | | | |
| Curing property | | Passed | Failed | Passed | Passed | Passed | Passed |
| Distance to a cured dark portion (mm) | | 0.5> | — | 0.5> | 0.5> | 0.5> | 0.5> |

As shown in Table 3, it was confirmed that all of the photosensitive compositions according to Examples 2-1 to 2-19 had a favorable curing property. In addition, among the photosensitive compositions according to Examples 2-1 to 2-19, the photosensitive composition that had the shortest distance to the cured dark portion was 2.4 mm (Example 2-16), whereby it was confirmed that the photosensitive compositions containing the chain transfer agents according to present Examples had a dark portion curing property.

Meanwhile, Comparative Example 2-1 had a distance to the cured dark portion shorter than 0.5 mm because Comparative Example 2-1 is made only from the ultraviolet curable material and does not contain the chain transfer agent.

In addition, as shown in Table 4, curing by ultraviolet light was not confirmed in the photosensitive composition according to Comparative Example 2-2 because the photosensitive composition according to Comparative Example 2-2 did not contain the ultraviolet curable material. That is, it was shown that the ultraviolet curable material that contained the (meth)acrylate ingredient and the photo polymerization initiator was necessary for the initial curing, and the ultraviolet curable material that was made only from the chain transfer agent could not be cured. Meanwhile, all of the photosensitive composition according to Example 2-1 to 2-4, which contained the chain transfer agent according to Comparative Example 2-2, contained also the ultraviolet curable materials, so that all of the photosensitive composition according to Example 2-1 to 2-4 were cured by ultraviolet irradiation.

In addition, Comparative Examples 2-3 and 2-4 had distances to the cured dark portions less than 0.5 mm, which meant that the curing of the dark portions hardly proceeded. Comparative Examples 2-3 and 2-4 contained the materials of Comparative Examples 1 and 2 (X-1 and X-2) that were made only from the ingredient (a) and did not contain the metal-containing compound of the ingredient (b), instead of containing the chain transfer agent according to Example 2-2. From this result, it was shown that the chain transfer agent needed to contain the ingredient (a) that was the compound containing the urethane bond, the urea bond or the isocyanate group, and the ingredient (b) that was the metal-containing compound in order to provide a dark portion curing property to the ultraviolet curable material.

The chain transfer agent according to the present invention is capable of transferring radicals generated by ultraviolet irradiation to a site such as a dark portion where radicals are not generated, and initiating to progress a radical polymerization reaction in the ultraviolet curable material. Thus, the chain transfer agent according to the present invention has the function of retaining the generated radicals for a certain period of time (hereinafter, the function is referred to as a radical retention capacity). A test to check the radical retention capacity of the chain transfer agent according to the present invention was performed.

[Test Method for Checking a Radical Retention Capacity]

Radicals in a substance can be detected with the use of an electron spin resonance (ESR) device, so that the detection of the radicals retained in the chain transfer agent were made by the method shown below in (1) to (5) to see the lifetime of the radicals.

(1) The ultraviolet curable material (A-2) shown in Table 2 was put in a glass tube having an inner diameter of 5 mm and a height of 50 mm such that the fluid level was 20 mm high.

(2) Then, the chain transfer agent (B-2) according to Example 2 shown in table 1 was gently added to the ultraviolet curable material from the top to the inside of the glass tube with the use of a micropipette to prepare a liquid of two layers consisting of the ultraviolet curable material and the chain transfer agent.

(3) The two-layered liquid was ultraviolet irradiated for ten seconds with the use of a UV (ultraviolet) lamp (100 mW/cm2, manufactured by SEN LIGHTS CO., LTD.).

(4) After the ultraviolet irradiation, by quickly separating the chain transfer agent, 20 μL of measurement sample was sampled from the separated chain transfer agent, and ESR measurement was performed on the measurement sample after two minutes from the ultraviolet irradiation. Conditions of measurement were JES-FA 200, POWER 2.0 mW, SWEEP TIME 30 sec.

(5) After leaving the measurement sample more two hours at room temperature, ESR measurement was performed on the measurement sample under the same conditions as the above-described measurement made after two minutes from the ultraviolet irradiation.

It is to be noted that for comparison, tests to evaluate a radical retention capacity were performed in the same manner as above also on the compound containing the isocyanate group (X-2) according to Comparative Example 2 shown in Table 1, and 2,4-diphenyl-4-methyl-1-pentene (DPMP) that was a known chain transfer agent.

[Concerning Results of the Tests to Evaluate a Radical Retention Capacity]

FIG. 1 is a chart showing a result of the ESR measurement of the chain transfer agent (B-2) according to Example 2. As shown in the chart of FIG. 1, in the chain transfer agent (B-2) according to Example 2, four organic radical peaks were detected in the vicinities of g values of 2.023, 2.009, 2.005, and 1.986 in the ESR measurement made after two minutes from the ultraviolet irradiation.

Figure 2:
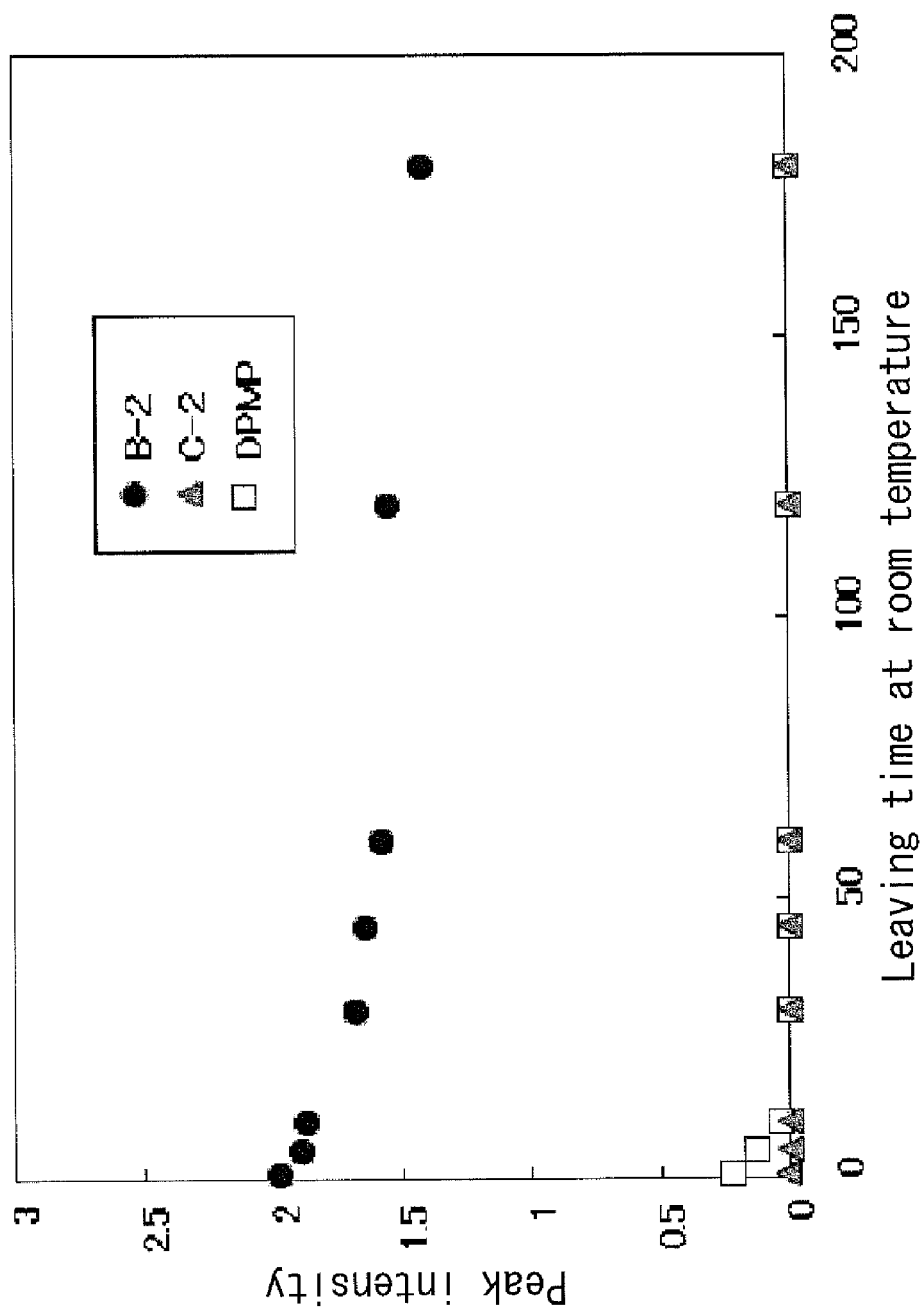
FIG. 2 is a graph showing a relation between a peak strength of the ESR measurement of the chain transfer agent and an amount of time when the chain transfer agent is left at room temperature.

FIG. 2 is a graph showing a relation between a measurement peak strength and an amount of time when the chain transfer agent is left at room temperature in relation to the ESR measurement results of the above-described three kinds of samples. As shown in FIG. 2, in the chain transfer agent (B-2) according to Example 2, the peak strength of the organic radicals attenuated only up to 80% even after two hours from the ultraviolet irradiation. From this result, it was shown that the chain transfer agent according to the present invention was capable of retaining the radicals in a stable manner for a long time. That is, it was confirmed that adding the chain transfer agent according to the present invention to the ultraviolet curable material allowed the radicals that were generated by the ultraviolet irradiation to be dispersed in the ultraviolet curable material via the chain transfer agent according to the present invention to cure the dark portion that the irradiation light does not reach.

In addition, as shown in the ESR measurement results in the chart of FIG. 2, in the compound containing the isocyanate group (C-2) according to Comparative Example 2, a peak of the organic radicals could not be detected at all even after two minutes from the ultraviolet irradiation. This result confirmed that only the compound containing the isocyanate group (C-2) could not retain the radicals, so that the dark portion could not be cured.

In addition, as shown in the ESR measurement results in the chart of FIG. 2, in the commercially available known chain transfer agent DMPA, a trace of a peak of the organic radicals was seen after two minutes from the ultraviolet irradiation; however, a peak of the organic radicals disappeared completely after two hours from the ultraviolet irradiation. From this result, it was shown that the radical retention capability of the DPMA was weak, and even if the DPMA once received the radicals, the radicals disappeared instantly, so that the radicals could not reach the dark portion. As shown in the results described above, it was shown that the chain transfer agent according to the present invention had the radical retention capability that had never seen in a conventional chain transfer agent, and the dark portion that ultraviolet light did not reach could be cured by this capability.

Examples 3-1 to 3-16, Comparative Example 3-1, 3-2

As shown in FIGS. 5 and 6, curing percentages of deep portions of photosensitive compositions that contained the ultraviolet curable materials (A-1 and A-2) shown in Table 1, the chain transfer agents (B-2 to B-12) shown in Table 2, and ultraviolet transmission inhibitors that defined any one of 30 parts by mass of talc (Talc), 30 parts by mass of carbon nanotube (VGCF), 30 parts by mass of polyvinyl chloride (PVC), and 300 parts by mass of polyvinyl chloride (PVC) were measured. It is to be noted that for comparison, as shown in Table 6, a curing percentage of a deep portion of a composition (Comparative Example 3-1) that contained the ultraviolet curable material (A-1) and an ultraviolet transmission inhibitor, and a curing percentage of a deep portion of a composition (Comparative Example 3-2) that contained the ultraviolet curable material (A-2) and an ultraviolet transmission inhibitor, the compositions being examples of compositions that did not contain the chain transfer agent, were measured in the same manner as the Examples described above. The test results are shown in Tables 5 and 6.

TABLE 5

| | | | Example | | | | | | | | | | |
|---|---|---|---|---|---|---|---|---|---|---|---|---|---|
| | | | 3-1 | 3-2 | 3-3 | 3-4 | 3-5 | 3-6 | 3-7 | 3-8 | 3-9 | 3-10 | 3-11 |
| Ingredient composition (Parts by mass) | | | | | | | | | | | | | |
| Ultraviolet curable | A-1 | | 60 | | | | | | | | | | |
| material | A-2 | | | 60 | 60 | 60 | 60 | 60 | 60 | 60 | 60 | 60 | 60 |
| Chain transfer agent | B-2 | | 40 | 40 | | | | | | | | | |
| | B-3 | | | | 40 | | | | | | | | |
| | B-4 | | | | | 40 | | | | | | | |
| | B-5 | | | | | | 40 | | | | | | |
| | B-6 | | | | | | | 40 | | | | | |
| | B-7 | | | | | | | | 40 | | | | |
| | B-8 | | | | | | | | | 40 | | | |
| | B-9 | | | | | | | | | | 40 | | |
| | B-10 | | | | | | | | | | | 40 | |
| | B-11 | | | | | | | | | | | | 40 |
| | B-12 | | | | | | | | | | | | |

TABLE 5-continued

| | | | Example | | | | | | | | | | | |
|---|---|---|---|---|---|---|---|---|---|---|---|---|---|---|
| | | | 3-1 | 3-2 | 3-3 | 3-4 | 3-5 | 3-6 | 3-7 | 3-8 | 3-9 | 3-10 | 3-11 |
| Test result | | | | | | | | | | | | | | |
| Curing percentages of deep portions | 30 parts by mass of Talc | 1 mm | >98% | >98% | >98% | >98% | >98% | >98% | >98% | >98% | >98% | >98% | >98% |
| | | 20 mm | >98% | >98% | >98% | >98% | >98% | >98% | >98% | >98% | >98% | >98% | 97% |
| | 30 parts by mass of VGCF | 1 mm | >98% | >98% | >98% | >98% | >98% | >98% | >98% | >98% | >98% | >98% | >98% |
| | | 20 mm | 92% | 95% | 95% | 95% | 93% | 92% | 91% | 90% | 88% | 87% | 86% |
| | 30 parts by mass of PVC | 1 mm | >98% | >98% | >98% | >98% | >98% | >98% | >98% | >98% | >98% | >98% | >98% |
| | | 20 mm | >98% | >98% | >98% | >98% | >98% | >98% | >98% | 96% | 96% | 96% | 90% |
| | 300 parts by mass of PVC | 1 mm | >98% | >98% | >98% | >98% | >98% | >98% | >98% | >98% | >98% | >98% | >98% |
| | | 20 mm | >98% | >98% | >98% | >98% | >98% | >98% | 97% | 94% | 93% | 92% | 88% |

TABLE 6

| | | | Example | | | | | Comparative Example | |
|---|---|---|---|---|---|---|---|---|---|
| | | | 3-12 | 3-13 | 3-14 | 3-15 | 3-16 | 3-1 | 3-2 |
| Ingredient composition (Parts by mass) | | | | | | | | | |
| Ultraviolet curable material | A-1 | | | | | | | 100 | |
| | A-2 | | 60 | 90 | 10 | 95 | 5 | | 100 |
| Chain transfer agent | B-2 | | | 10 | 90 | 5 | 95 | | |
| | B-3 | | | | | | | | |
| | B-4 | | | | | | | | |
| | B-5 | | | | | | | | |
| | B-6 | | | | | | | | |
| | B-7 | | | | | | | | |
| | B-8 | | | | | | | | |
| | B-9 | | | | | | | | |
| | B-10 | | | | | | | | |
| | B-11 | | | | | | | | |
| | B-12 | | 40 | | | | | | |
| Test result | | | | | | | | | |
| Curing percentages of deep portions | 30 parts by mass of Talc | 1 mm | >98% | >98% | >98% | >98% | >98% | 85% | 87% |
| | | 20 mm | 97% | >98% | >98% | 96% | 96% | Failed | Failed |
| | 30 parts by mass of VGCF | 1 mm | >98% | >98% | >98% | 96% | 95% | 25% | 26% |
| | | 20 mm | 88% | 88% | 88% | 86% | 86% | Failed | Failed |
| | 30 parts by mass of PVC | 1 mm | >98% | >98% | >98% | >98% | >98% | 89% | 92% |
| | | 20 mm | 91% | >98% | >98% | 93% | >98% | 1%> | 1%> |
| | 300 parts by mass of PVC | 1 mm | >98% | >98% | >98% | >98% | >98% | 76% | 79% |
| | | 20 mm | 88% | 94% | 95% | 87% | 88% | 1%> | 1%> |

A specific method for preparing the photosensitive compositions and cured products shown in Tables 5 and 6 is described below. A predetermined amount of each of Talc, VGCF, and PVC shown in Tables 5 and 6 were added as infilling/blending materials (ultraviolet transmission inhibitors) to 100 parts by mass of composition containing the chain transfer agent and the ultraviolet curable material that were yet to be blended, and tests to evaluate a dark portion curing property were performed on the compositions. The abbreviated expressions in Tables 5 and 6 are as follows. The abbreviated expressions with no specific indication of a manufacture are reagent grades manufactured by TOKYO CHEMICAL INDUSTRY CO., LTD.

Talc: talc (13 μm in particle diameter) (manufactured by NIPPON TALC CO., LTD., MS-P)

VGCF: carbon nanotube (150 nm in diameter) (manufactured by SHOWA DENKO K.K., VGCF-H)

PVC: polyvinyl chloride (n=1100) (manufactured by WAKO PURE CHEMICAL INDUSTRIES, LTD.)

(Preparation of Compositions Yet to be Blended)

The ultraviolet curable materials (A-1 and A-2) and the chain transfer agents (B-2 to B-12) shown in Table 2 were blended so as to have the ratios (parts by mass) shown in Tables 5 and 6 with the use of an agitation equipment, and dissolved or dispersed. Thus, the compositions yet to be blended were prepared.

(Preparation of Infilled/Blended Photosensitive Compositions)

Each of 30 parts by mass of Talc and 30 parts by mass of VGCF was added to 100 parts by mass of the composition yet to be blended, and each composition was blended with the use of an agitation equipment such that each of Talc and VGCF was uniformly dispersed and infilled in the composition. The talc infilled photosensitive composition was a white viscous liquid, and the VGCF infilled photosensitive composition was a black viscous liquid.

The PVC compound was not dispersed just by being agitated as it was, so that the following method was used to blend the PVC compound.

1) A PVC resin was dissolved in THF at 40 degrees C., and a solution of 30% was prepared.

2) The solution prepared in 1) of the amount corresponding to 30 or 300 parts by mass of PVC was added to 100 parts by mass of each of the compositions yet to be blended, and was blended with the use of an agitation equipment to be uniformly dissolved.

3) The compositions were left while shielded at 40 degrees C. for thirty-six hours to volatilize THF. Thus, lumps of PVC-blended photosensitive compositions each having a thickness of 3 cm were obtained.

The PVC-blended photosensitive compositions were white rubber-like solid substances. The PVC-blended photosensitive compositions containing 300 parts by mass of PVC were stronger in whiteness.

(Ultraviolet Curing)

Because the Talc infilled photosensitive compositions and VGCF infilled photosensitive compositions had a flow property, each of the Talc infilled photosensitive compositions and the VGCF infilled photosensitive compositions was put in a hard Teflon tube (Teflon is a registered trademark) having an inner diameter of 10 mm such that the fluid level was 30 mm high, and was cured by being ultraviolet irradiated for ten seconds from the above with the use of a UV lamp (100 mW/cm2, manufactured by SEN LIGHTS CO., LTD.). The cured products were left in the tubes and stored at room temperature in a dark room.

Because the PVC-blended photosensitive compositions had no flow property, each lump of the prepared compositions was cut to have a cross section of 1 mm×1 mm and a height of 30 mm, and was cured by being ultraviolet irradiated for ten seconds from the above with the use of a UV lamp (100 mW/cm2, manufactured by SEN LIGHTS CO., LTD.). The cured products were stored at room temperature in a dark room.

(Test Method for Measuring a Curing Percentage of a Deep Portion)

Figure 3:
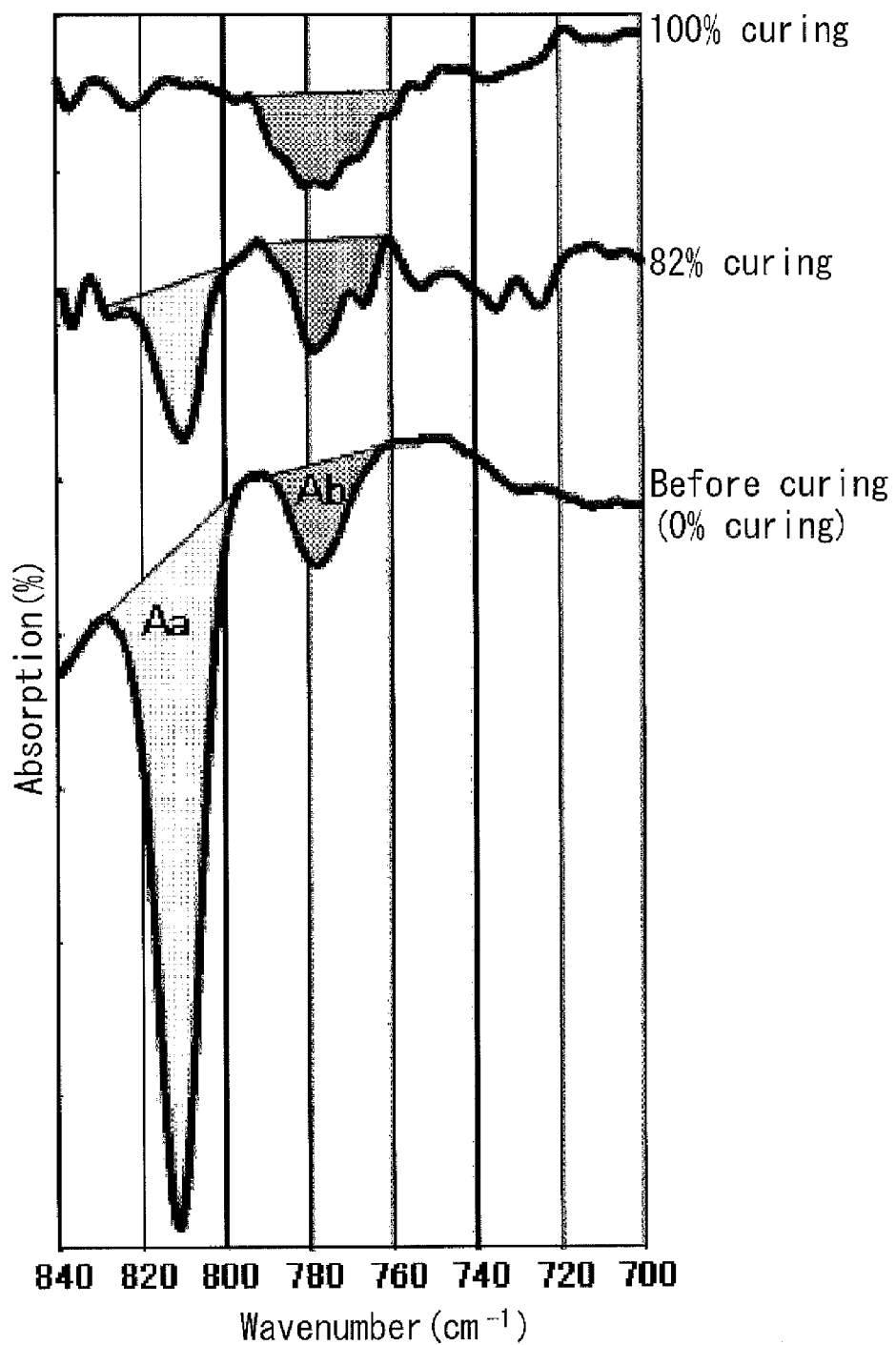
FIG. 3 is a chart showing a measurement result of FT-IR of double bonds of an acrylate.

A curing percentage was measured by determining quantity of the residual quantity of FT-IR of double bonds of an acrylate that related to curing polymerization in each ultraviolet curable material. The measurement method is described below. FIG. 3 is a chart showing a measurement result of FT-IR of the double bonds of the acrylate. As shown in FIG. 3, unsaturated double bonds of the acrylate have special infrared absorption at 811 cm-1 (Aa absorption at the peak before curing shown in FIG. 3). When the acrylate is cured completely, the double bonds of the acrylate are consumed, so that the peak disappears. In addition, amido N—H bonds that have no relation with the polymerization reaction of the acrylate have absorption in the vicinity of 775 cm-1 (Ab absorption at the peak before curing shown in FIG. 3). A percentage of curing reaction can be calculated by obtaining the ratio Aa/Ab between a spectral area Aa and spectral area Ab, and comparing the obtained ratio with the ratio Aa/Ab at 0% curing and the ratio Aa/Ab at 100% curing that have been measured in advance. Table 7 shows relative areas at the peaks in the graph of FIG. 3. As shown in Table 7, the ratio Aa/Ab at 0% curing that is the lowest is 5.585, the ratio Aa/Ab at 100% curing that is the top is 0, and the ratio Aa/Ab at the peak that is at the midpoint is 5.585, so that the percentage of curing reaction of 82% can be calculated by the following mathematical expression.

Percentage of curing reaction=(5.585−1.006)/5.585× 100=82%

TABLE 7

| | Relative area | | |
|---|---|---|---|
| | Aa | Ab | Aa/Ab |
| 100% curing | 0 | 508 | 0 |
| 82% curing | 468 | 465 | 1.006 |
| 0% curing | 1413 | 253 | 5.585 |

The curing percentages of the infilled/blended photosensitive compositions that were cured by ultraviolet irradiation defined curing percentages in the vicinity of the irradiation surfaces that were measured on cross sections at the depth of 1 mm from the irradiation surfaces, and curing percentages of the dark portions measured on cross sections at the depth of 20 mm from the irradiation surfaces. The FT-IR on the cross sections was measured to obtain Aa/Ab, and the curing percentages (%) were calculated based on the Aa/Ab and shown in Tables 5 and 6. The photosensitive compositions that were not cured and could not be sampled were rated as "failed". In this case, the curing percentage was less than 1%.

Evaluation Results, Examples 3-1 to 3-16, and Comparative Examples 3-1 and 3-2

The photosensitive compositions according to Comparative Examples 3-1 and 3-2 did no t contain the chain transfer agent, so that when the Talc, VGCF and PVC were infilled/blended in the photosensitive compositions, attenuation of the curing percentages was seen even in the depth of 1 mm from the surfaces, and curing by ultraviolet irradiation was not seen in the depth of 20 mm. It was shown that in the dark portion curing of photosensitive compositions containing the ultraviolet transmission inhibitors, the amounts of ultraviolet light necessary for curing became insufficient from the vicinity of the irradiation surfaces, and no cured product was obtained in the depth of 20 mm.

Meanwhile, it was confirmed that in the photosensitive compositions according to Examples 3-1 to 3-16 that contained the chain transfer agents, the curable activated species (radicals) that were generated on the irradiation surfaces dispersed into the deep portions, so that curing percentages of 85% or more could be obtained even in the depth of 20 mm only by the ultraviolet irradiation.

Example 3-17, and Comparative Example 3-3

Evaluation of a PVC Blended Photosensitive Sheet

Usually when an ultraviolet curable material and polymer are blended, they become a white clouded material because they are different in dissolution parameter (SP value) and refraction index, so that ultraviolet transmission is inhibited to cause insufficient curing. In order to solve this problem, a test to verify that a sheet having a sufficient curing property could be produced by using the photosensitive composition according to the present invention in which PVC that functioned as flexible polymer was contained was performed.

(Production of a Sheet Made from a PVC Blended Photosensitive Composition)

(a) A PVC resin was dissolved in THF at 40 degrees C., and a solution of 30% was prepared.

(b) The solution prepared in the (a) step of the amount corresponding to 300 parts by mass of PVC was added to 100 parts by mass of composition yet to be blended according to Example 3-2 (Table 5) in a beaker, and was blended with the use of an agitation equipment to be uniformly dissolved (Example 3-17, a composition before drying).

(c) A solution that was a comparative example different from the solution prepared in the (b) step in containing the composition yet to be blended according to Comparative Example 3-2 (Table 6) was prepared Comparative Example 3-3, a composition before drying).

(d) each of 165 g of the solution prepared in the (b) step (Example 3-17, a composition before drying) (containing 60 g of the photosensitive composition), and 165 g the solution prepared in the (c) step (Comparative Example 3-3, a composition before drying) (containing 60 g of the photosensitive composition) was put in a 200 mm×300 mm stainless tray, and uniformly flattened, and then dried at room temperature for two days while shielded. Thus, white sheets having a thickness of 1 mm were prepared (Example 3-17 and Comparative Example 3-3). Both of the sheets according to Example 3-17 and Comparative Example 3-3 were flexible rubber-like sheets that were capable of stretching.

(Curing of a Sheet Made from a PVC Blended Photosensitive Composition)

Each of the sheets according to Example 3-17 and Comparative Example 3-3 was wound around a wire bundle 2 cm in diameter, and was ultraviolet irradiated from two lateral sides for ten seconds per side with the use of a UV lamp (100 mW/cm2, manufactured by SEN LIGHTS CO., LTD.), and then left to be cooled in a dark room for ten minutes.

Evaluation Results, Example 3-17, and Comparative Example 3-3

The sheet according to Example 3-17 was uniformly cured and could not be bent after the ultraviolet irradiation while the sheet according to Comparative Example 3-3 could be easily bent even after the ultraviolet irradiation. It was obvious that in the sheet according to Comparative Example 3, the ultraviolet irradiation was inhibited by the influence of light scattering caused by the PVC contained in the photosensitive composition, so that the curing did not proceed uniformly.

Meanwhile, it was confirmed that according to Example 3-17, the uniformly cured product could be produced from the photosensitive composition containing the chain transfer agent only by the ultraviolet irradiation even when the photosensitive composition is a PVC mixture in which ultraviolet transmission is inhibited by the influence of light scattering, whereby a curing material in the form of a sheet or a tape could be produced.

That is, a photosensitive composition that can directly wrap or be adhered to an object and thereby is made easier to handle can be produced easily.

Examples 4-1 to 4-10, and Comparative Examples 4-1 and 4-2

Hereinafter, photosensitive compositions according to Examples 4-1 to 4-10, and Comparative Examples 4-1 and 4-2 will be described, each of which contains a polyisocyanate compound having two or more isocyanate groups, (meth)acrylate of a polyol having one or less hydroxyl group, the number of which is set by ester bonding two or more hydroxyl groups of and the polyol having two or more hydroxyl groups with the (meth)acrylate, and an ultraviolet polymerization initiator.

Curable liquid compositions having the ingredient compositions (parts by mass) shown in Table 8 were prepared by blending the ingredients with the use of an agitation equipment to dissolve or disperse. The ingredients are described below. Evaluations to evaluate a curing property and a dark portion curing property were performed in accordance with the following measurement method and evaluation method. The results of the evaluations are shown in Table 8 together with the ingredient compositions.

<(Meth)acrylate Ingredient>

DPGA: ["Dipropylene glycol diacrylate" manufactured by TOKYO CHEMICAL INDUSTRY CO., LTD.]

TEGDA: ["Tetraethylene glycol diacrylate" manufactured by TOKYO CHEMICAL INDUSTRY CO., LTD.]

AMPOH: ["1-acryloyloxy-3-methacryloyloxy-2-propanol(2-hydroxy-3-acryloyloxy propyl methacrylate)" manufactured by TOKYO CHEMICAL INDUSTRY CO., LTD.]

(Ultraviolet polymerization initiator)

HCHPK: ["1-hydroxycyclohexyl phenyl ketone" manufactured by TOKYO CHEMICAL INDUSTRY CO., LTD.]

EANT: ["2-ethyl anthraquinone" manufactured by TOKYO CHEMICAL INDUSTRY CO., LTD.]

(Polyisocyanate compound)

N3600: ["DESMODUR N3600" manufactured by SUMIKA BAYER URETHANE CO., LTD.]

N3200: ["DESMODUR N3200" manufactured by SUMIKA BAYER URETHANE CO., LTD.]

(Metal complex compound)

BPDZ: ("Bis(2,4-pentanedionato)zinc(II)" manufactured by TOKYO CHEMICAL INDUSTRY CO., LTD.]

CDEDTC: ("Zinc (II) diethyldithiocarbamate" manufactured by TOKYO CHEMICAL INDUSTRY CO., LTD.]

DBTDL: ("dibutyltindilaurate" manufactured by TOKYO CHEMICAL INDUSTRY CO., LTD.]

(Curing Property)

Each of the curable liquid compositions was put in a glass tube having an inner diameter of 5 mm and a height of 50 mm such that the fluid level was 20 mm high, and was ultraviolet irradiated for ten seconds from the side with the use of a UV lamp (100 mW/cm2, manufactured by SEN LIGHTS CO., LTD.). Then, each of the curable liquid compositions was left for one minute at room temperature, and then a glass rod having a diameter of 1.5 mm was inserted from the top to check with finger touch whether or not each of the curable liquid compositions was cured. The curable liquid compositions into which the glass rod could not be inserted below the fluid level were regarded as cured and rated "passed", and the curable liquid compositions into which the glass rod could be easily inserted below the fluid level were regarded as uncured and rated "failed".

(Dark Portion Curing Property)

Each of the curable liquid compositions was put in a glass tube having an inner diameter of 5 mm and a height of 50 mm such that the fluid level was 20 mm high. The upper half (10 mm) of each content in the glass tube was wrapped with an aluminum foil to make a light-shielded portion. Then, each of the curable liquid compositions was ultraviolet irradiated for ten seconds from the side with the use of a UV lamp (100 mW/cm2, manufactured by SEN LIGHTS CO., LTD.). Then, each of the curable liquid compositions was left for one minute at room temperature and left for one hour at room temperature, and then a glass rod having a diameter of 1.5 mm was inserted from the top to check the cured portion, and the distance to each cured portion that proceeded to the upper portion (unirradiated portion) from the border between the ultraviolet irradiation face and the light-shielded face was measured. The evaluation to evaluate whether or not the curable liquid compositions were cured was performed in a same manner as the evaluation performed in the test method for evaluating a curing property.

TABLE 8

| | | Example | | | | | | | | | | Comparative Example | |
|---|---|---|---|---|---|---|---|---|---|---|---|---|---|
| | | 4-1 | 4-2 | 4-3 | 4-4 | 4-5 | 4-6 | 4-7 | 4-8 | 4-9 | 4-10 | 4-1 | 4-2 |
| (Meth)acrylate | DPGA | 50 | | | 50 | 50 | 50 | 50 | 50 | 8 | 92 | 100 | |
| | TEGDA | | 50 | | | | | | | | | | |
| | AMPOH | | | 50 | | | | | | | | | |
| Ultraviolet polymerization initiator | HCHPK | 3 | 3 | 3 | 3 | | 3 | 3 | 3 | 3 | 3 | 3 | 3 |
| | EANT | | | | | 3 | | | | | | | |
| Polyisocyanate compound | N3600 | 50 | 50 | 50 | | 50 | 50 | 50 | 50 | 92 | 8 | | 100 |
| | N3200 | | | | 50 | | | | | | | | |
| Metal complex compound | BPDZ | 0.5 | 0.5 | 0.5 | α5 | 0.5 | | | | 5 | 0.5 | 5 | 0.5 |
| | CDEDTC | | | | | | | 0.5 | | | | | |
| | DBTDL | | | | | | | | 0.5 | | | | |
| Curing property | | Passed | Passed | Passed | Passed | Passed | Passed | Passed | Passed | Passed | Passed | Passed | Failed |
| Distance to a cured dark portion (mm) after 1 min | | 9.5 | 7.8 | 6.9 | 9.4 | 9 | 8.6 | 6.4 | 1.9 | 2.4 | 1.3 | 0.5 | — |
| Distance to a cured dark portion (mm) after 1 hr | | 10< | 10< | 10< | 10< | 10< | 10< | 10< | 6.8 | 7.3 | 5.1 | 0.5 | — |

In the evaluation on a curing property, curing by ultraviolet light was not seen in the curable liquid composition according to Comparative Example 4-2 because the curable liquid composition according to Comparative Example 4-2 did not contain the (meth)acrylate ingredient. That is, it was shown that the (meth)acrylate ingredient was necessary for the initial curing, and the curable liquid composition could not be cured even if the other ingredients were sufficiently contained therein. Meanwhile, it was confirmed that all of the curable liquid compositions according to the present Examples were cured by ultraviolet irradiation, and cured products were produced.

In the evaluation on a dark portion curing property, curing of a dark portion hardly proceeded in the curable liquid composition according to Comparative Example 4-1 even after the curable liquid composition according to Comparative Example 4-1 was left for one hour at room temperature. This meant that curing hardly proceeded because the curable liquid composition according to Comparative Example 4-1 did not contain the polyisocyanate ingredient.

Meanwhile, the curable liquid compositions according to Examples 4-1 to 4-10 had distances to the cured dark portion that are equal to or longer than 5 mm to the unirradiated portions from the borders between the ultraviolet irradiation faces and the light-shielded faces. Thus, the dark portion curing properties of the curable liquid compositions according to Examples 4-1 to 4-10 were confirmed.

As described above in the Examples, the cured products can be made from the photosensitive composition containing the polyisocyanate compound, the (meth)acrylate of the specific polyol, and the ultraviolet polymerization initiator by ultraviolet irradiation. In addition, not only the cured product in which a portion that is irradiated with ultraviolet light is cured can be obtained, but also the cured product in which a portion that ultraviolet light does not reach (dark portion) is cured can be obtained. Therefore, according to the present invention, the portion of the composition that light does not reach (dark portion) can be cured while the composition maintains the advantage of an ultraviolet curing property of being curable in a short time.

It is presumed that the (meth)acrylate of the specific polyol is radical reacted by the ultraviolet polymerization initiator when the composition is irradiated with ultraviolet light, and at this time, reaction activated species that cure the polyisocyanate compound are generated from the (meth)acrylate of the specific polyol to disperse, whereby the polyisocyanate compound in the dark portion is cured.

In addition, in the photosensitive composition described above, the number of hydroxyl group of the (meth)acrylate of the specific polyol is set to be one or less, so that a urethane reaction of the (meth)acrylate of the specific polyol with the polyisocyanate compound is inhibited from proceeding in the state of being blended with the polyisocyanate compound. Thus, preservation stability of the present composition is improved. The number of hydroxyl group of the (meth)acrylate of the specific polyol is preferably one or zero. It is more preferable that the number of hydroxyl group of the (meth)acrylate of the specific polyol should be zero from the viewpoint of preservation stability of the present composition.

Considering that the effects of the present invention are easily achieved, dipropylene glycol diacrylate, tetraethyl ene glycol diacrylate, or 1-acryloyl oxy-3-methacryloyloxy-2-propanol (2-hydroxy-3-acryloyloxy propyl methacrylate) is preferably used as the (meth)acrylate of the specific polyol.

The (meth)acrylate of the specific polyol is contained in the photosensitive composition at the ratio between the polyisocyanate compound and the (meth)acrylate of the specific polyol preferably within a range from 90:10 to 10:90 at a mass ratio, and more preferably within a range from 80:20 to 20:80 at a mass ratio. When the content of the (meth)acrylate of the specific polyol is more than 90, the content is too large to the content of the polyisocyanate compound, so that the amount of the polyisocyanate compound that is in charge of curing reaction becomes insufficient, whereby the curing speed in the dark portion tends to be reduced. On the other hand, also when the content of the (meth)acrylate of the specific polyol is less than 10, the amount of the generated activated species that cure the polyisocyanate compound becomes insufficient, whereby the curing speed in the dark portion tends to be reduced.

In addition, the content of the ultraviolet polymerization initiator is preferably within a range of 0.01 to 10 parts by mass with respect to 100 parts by mass of the mixture of the polyisocyanate compound and the (meth)acrylate of the specific polyol, and more preferably within a range of 0.1 to 7 parts by mass. When the content of the ultraviolet polymerization initiator is less than 0.01 parts by mass, the amount of the ultraviolet polymerization initiator is too small, whereby a curing reaction by ultraviolet light is not easily initiated. On the other hand, when the content of the ultraviolet polymerization initiator is more than 10 parts by mass, an insoluble matter is generated, whereby the physical properties of the cured product could be lost.

In addition, it is preferable that the photosensitive composition should further contain a metal complex compound. When the metal complex compound is contained in the photosensitive composition, the curing speed at the dark portion can be further improved.

Examples of the metal complex compound include the metal complex compounds of the photosensitive composition described above. Examples of the metal complex compound include metals selected from the group consisting of tin, copper, zinc, cobalt, and nickel.

The content of the metal complex compound is preferably within a range of 0.01 to 10 parts by mass with respect to 100 parts by mass of the mixture of the polyisocyanate compound and the (meth)acrylate of the specific polyol, and more preferably within a range of 0.05 to 5 parts by mass. When the content of the metal complex compound is less than 0.01 parts by mass, the amount of the metal complex compound is too small, whereby the photosensitive composition becomes less effective in improving the curing speed in the dark portion. On the other hand, when the content of the metal complex compound is more than 10 parts by mass, an insoluble matter is generated, whereby preservation stability of the present composition could be decreased, or the physical properties of the cured product could be lost.

The foregoing description of the preferred embodiments of the present invention has been presented for purposes of illustration and description; however, it is not intended to be exhaustive or to limit the present invention to the precise form disclosed, and modifications and variations are possible as long as they do not deviate from the principles of the present invention.

The invention claimed is:

1. A photosensitive composition comprising:
   an ultraviolet curable material; and
   a chain transfer agent comprising:
      an ingredient (a) that comprises a compound comprising at least one selected from the group consisting of a urethane bond, a urea bond, and an isocyanate group; and
      an ingredient (b) that comprises a metal-containing compound, wherein:
   a portion of the composition where irradiation light does not reach is curable;
   the composition is not moisture-curable;
   the chain transfer agent does not contain a thermal radical generating agent; and
   a mass ratio of the ingredient (a) to the ingredient (b) is in a range of from 100:0.001 to 100:1.

2. The photosensitive composition according to claim 1, wherein a ratio between the ultraviolet curable material and the chain transfer agent is within a range from 90:10 to 10:90.

3. The photosensitive composition according to claim 1, wherein the metal-containing compound is a tin-containing compound, or a compound comprising at least one metal selected from the group consisting of zinc, cobalt, and nickel, the tin-containing compound being selected from the group consisting of bis(2,4-pentanedionato)tin, dibutyltin bis(trifluoromethanesulfonate), dibutyltin diacetate, dibutyltin maleate, phthalocyaninetin(IV) dichloride, tetrabutyl ammonium difluoro triphenyltin, tin(II) phthalocyanine, tributyl(2-pyridyl)tin, tributyl(2-thienyl)tin, tributyltin acetate, tributyl(trimethylsilylethinyl)tin, and trimethyl(2-pyridyl)tin.

4. The photosensitive composition according to claim 1, wherein the mass ratio of the ingredient (a) and the ingredient (b) is in a range of from 100:0.001 to 100:10.

5. A cured product that comprises the photosensitive composition according to claim 1 that is cured.

6. A photosensitive composition comprising:
   an ultraviolet curable material;
   a chain transfer agent; and
   an ultraviolet transmission inhibitor to inhibit ultraviolet transmission,
   wherein:
   the chain transfer agent comprises
      an ingredient (a) that comprises a compound comprising at least one selected from the group consisting of a urethane bond, a urea bond, and an isocyanate group, and
      an ingredient (b) that comprises a metal-containing compound;
   the composition is not moisture-curable;
   the chain transfer agent does not contain a thermal radical generating agent; and
   a mass ratio of the ingredient (a) to the ingredient (b) is in a range of from 100:0.001 to 100:1.

7. The photosensitive composition according to claim 6, wherein the metal-containing compound is a tin-containing compound, or a compound comprising at least one metal selected from the group consisting of zinc, cobalt, and nickel, the tin-containing compound being selected from the group consisting of bis(2,4-pentanedionato)tin, dibutyltin bis(trifluoromethanesulfonate), dibutyltin diacetate, dibutyltin maleate, phthalocyaninetin(IV) dichloride, tetrabutyl ammonium difluoro triphenyltin, tin(II) phthalocyanine, tributyl(2-pyridyl)tin, tributyl(2-thienyl)tin, tributyltin acetate, tributyl(trimethylsilylethinyl)tin, and trimethyl(2-pyridyl)tin.

8. The photosensitive composition according to claim 6, wherein the mass ratio of the ingredient (a) and the ingredient (b) is in a range of from 100:0.001 to 100:10.

9. A cured product that comprises the photosensitive composition according to claim 6 that is cured by an ultraviolet curing reaction.

10. The photosensitive composition according to claim 2, wherein the metal-containing compound is a tin-containing compound, or a compound comprising at least one metal selected from the group consisting of zinc, cobalt, and nickel, the tin-containing compound being selected from the group consisting of bis(2,4-pentanedionato)tin, dibutyltin bis(trifluoromethanesulfonate), dibutyltin diacetate, dibutyltin maleate, phthalocyaninetin(IV) dichloride, tetrabutyl ammonium difluoro triphenyltin, tin(II) phthalocyanine, tributyl(2-pyridyl)tin, tributyl(2-thienyl)tin, tributyltin acetate, tributyl(trimethylsilylethinyl)tin, and trimethyl(2-pyridyl)tin.

11. The photosensitive composition according to claim 7, wherein the mass ratio of the ingredient (a) and the ingredient (b) is in a range of from 100:0.001 to 100:10.

12. A cured product that comprises the photosensitive composition according to claim 11 that is cured by an ultraviolet curing reaction.

13. The photosensitive composition according to claim 1, wherein the ingredient (a) of the chain transfer agent comprises a compound comprising a urethane bond.

14. The photosensitive composition according to claim 6, wherein the ingredient (a) of the chain transfer agent comprises a compound comprising a urethane bond.

15. The photosensitive composition according to claim 1, wherein:
the ingredient (a) is a mixture of a polyisocyanate compound and a (meth)acrylate of a polyol; and
the mass ratio of the ingredient (a) to the ingredient (b) is in a range of from 100:0.001 to 100:0.5.

16. The photosensitive composition according to claim 1, wherein the chain transfer agent does not contain a mercapto group.

17. The photosensitive composition according to claim 1, wherein the metal-containing compound is selected from the group consisting of bis (2,4-pentanedionato)tin, dibutyltin bis(trifluoromethanesulfonate), dibutyltin diacetate, dibutyltin maleate, phthalocyaninetin(IV) dichloride, tetrabutyl ammonium difluoro triphenyltin, tin(II) phthalocyanine, tributyl(2-pyridyl)tin, tributyl(2-thienyl)tin, tributyltin acetate, tributyl(trimethylsilylethinyl)tin, trimethyl(2-pyridyl)tin, bis(hexafluoroacetylacetonato)copper(II) salt, bis(2,4-pentanedionato)copper(II), bis(1,3-propanediamine) copper(II)dichloride, bis(8-quinolinolate)copper(II), bis(trifluoro-2,4-pentanedionato)copper(II), copper(II) bis(2-hydroxyethyl)dithiocarbamate, copper diethyldithiocarbamate, copper(II) dimethyldithiocarbamate, ethylenediaminetetraacetic acid copper(II)disodium salt, phthalocyanine copper(II), dichloro(1,10-phenanthroline)copper(II), phthalocyanine copper, tetra-4-tert-butylphthalocyanine copper, tetrakis(acetonitrile)copper(I) hexafluorophosphate, bis[2-(2-benzothiazolyl)phenolato]zinc(II), bis[2-(2-benzoxazolyl)phenolato]zinc(II), bis(2-hydroxyethyl)dithiocarbamic acid]zinc(II) salt, bis(2,4-pentanedionato)zinc(II), bis (8-quinolinolate)zinc(II), bis(tetrabutylammonium) bis(1,3-dithiol-2-thione-4,5-dithiolato)zinc complex, ethylenediaminetetraacetic acid disodium zinc salt, zinc(II) dibenzyldithiocarbamate, zinc(II) dibutyldithiocarbamate, zinc diethyldithiocarbamate, zinc dimethyldithiocarbamate, phthalocyanine zinc, bis(cyclopentadienyl)cobalt(III) hexafluorophosphate, [1,1'-bis(diphenylphosphino)ferrocene]cobalt(II) dichloride, bis(hexafluoroacetylacetonato) cobalt(II), (1R,2R)-N,N'-bis[3-oxo-2-(2,4,6-trimethylbenzoyl)butylidene]-1,2-diphenylethylenediaminato cobalt(II), (1S,2S)-N,N'-bis[3-oxo-2-(2,4,6-trimethylbenzoyl)butylidene]-1,2-diphenylethylenediaminato cobalt(II), bis(2,4-pentanedionato)cobalt(II), bis(trifluoro-2,4-pentanedionato) cobalt(II), phthalocyanine cobalt(II), ethylenediaminetetraacetic acid disodium cobalt salt, hexaamminecobalt(III) chloride, N,N'-disalicylalethylenediamine cobalt(II), [5,10,15,20-tetrakis(4-methoxyphenyl) porphyrinato]cobalt(II), tris(2,4-pentanedionato)cobalt(III), [1,2-bis(diphenylphosphino)ethane]nickel(II) dichloride, bis (dithiobenzil)nickel(II), bis(hexafluoroacetylacetonato) nickel(II), bis(2,4-pentanedionato)nickel(II), bis(tetrabutylammonium) bis(maleonitriledithiolato)nickel(II) complex, bis(tricyclohexylphosphine)nickel(II) dichloride, bis(triphenylphosphine)nickel(II) dichloride, bromo[(2,6-pyridinediyl)bis(3-methyl-l-imidazolyl-2-ylidene)]nickel bromide, ethylenediaminetetraacetic acid disodium nickel(II) salt, nickel(II) dibutyldithiocarbamate, and nickel diethyldithiocarbamate.

18. The photosensitive composition according to claim 1, wherein the metal-containing compound is selected from the group consisting of bis(2,4-pentanedionato)zinc(II), zinc (II) diethyldithiocarbamate, bis(2,4-pentanedionato)cobalt(II), and nickel(II) dibutyldithiocarbamate.

\* \* \* \* \*